US008024442B1

(12) United States Patent
Roussos et al.

(10) Patent No.: US 8,024,442 B1
(45) Date of Patent: Sep. 20, 2011

(54) CENTRALIZED STORAGE MANAGEMENT FOR MULTIPLE HETEROGENEOUS HOST-SIDE SERVERS

(75) Inventors: Konstantinos Roussos, Sunnyvale, CA (US); Kumaravel Thillai, Chennai (IN); Anupama Kirpekar, Saratoga, CA (US); Atul Bhalodia, Cary, NC (US); Vani Bappanadu, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 264 days.

(21) Appl. No.: 12/169,395

(22) Filed: Jul. 8, 2008

(51) Int. Cl.
*G06F 15/173* (2006.01)
*G06F 9/34* (2006.01)
(52) U.S. Cl. ...................... 709/223; 711/202
(58) Field of Classification Search .................. 709/203, 709/223, 224, 229, 212, 226; 711/6, 162, 711/170, 173, 203, 147, 148, 202
See application file for complete search history.

(56) References Cited

U.S. PATENT DOCUMENTS

| | | | |
|---|---|---|---|
| 6,839,740 B1* | 1/2005 | Kiselev ........................ | 709/214 |
| 2001/0054093 A1* | 12/2001 | Iwatani ........................ | 709/223 |
| 2003/0135439 A1* | 7/2003 | Yagishita ...................... | 705/36 |
| 2003/0204701 A1* | 10/2003 | Mimatsu et al. ............. | 711/203 |
| 2004/0122917 A1* | 6/2004 | Menon et al. ................. | 709/219 |
| 2004/0230766 A1* | 11/2004 | Cameron ..................... | 711/203 |
| 2005/0114438 A1* | 5/2005 | Bendich et al. .............. | 709/203 |
| 2006/0236068 A1* | 10/2006 | Li et al. ....................... | 711/173 |
| 2006/0282485 A1* | 12/2006 | Aggarwal et al. ............ | 707/206 |
| 2007/0277017 A1* | 11/2007 | Yamane et al. ............... | 711/170 |
| 2007/0283119 A1* | 12/2007 | Sarkar et al. ................. | 711/170 |
| 2008/0028143 A1* | 1/2008 | Murase ......................... | 711/114 |
| 2008/0155169 A1* | 6/2008 | Hiltgen et al. ................ | 711/6 |

OTHER PUBLICATIONS

NetApp., Snapshot™, http://www.netapp.com/products/enterprise-software/storage-system, Dated Aug. 14, 2007, 1 pg.
Symantec, Veritas CommandCentral™ Storage, Dated Jun. 2007, 5 pgs.
AppIQ Puts a New Face on File-Level SRM, http://www.searchstorage.tachtarget.com/originalConent Dated Aug. 14, 2007, 3 pgs.

* cited by examiner

*Primary Examiner* — Andrew Caldwell
*Assistant Examiner* — Jonathan Willis
(74) *Attorney, Agent, or Firm* — Blakely, Sokoloff, Taylor & Zafman LLP

(57) ABSTRACT

Centralized management of both host-side storage objects on multiple heterogeneous host-side servers and logical data containers on a storage system is performed by a management server. In one embodiment, the management server automatically provisions a logical data container on the storage server according to the storage virtualization strategy without administrator interaction at the storage system. In another embodiment, the management server automatically performs a snapshot operation on logical data containers on the storage system according to the storage virtualization strategy without administrator interaction at the storage system. In another embodiment, the management server centrally monitors for out-of-space events in the storage system and automatically correlates the out-of-space events in the storage system to out-of-space events for the host-side file systems.

28 Claims, 12 Drawing Sheets

CENTRALIZED STORAGE MANAGEMENT FOR MULTIPLE HETEROGENEOUS HOST-SIDE SERVERS

TECHNICAL FIELD

This invention relates to the field of network data storage systems and, in particular, to centralized storage management for multiple heterogeneous host-side servers.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc. These data storage systems use storage virtualization to abstract the logical storage from the physical storage to provide a resource pool of storage resources. However, host-side servers, which interact with these data storage systems, use various types of different virtualizations than the storage virtualization on the storage systems. For example, every vendor of resources, such as vendors of applications, databases, servers, and storage devices, attempts to add value from virtualization, but has consequently adopted a different storage virtualization strategy for their particular resource. Storage virtualization, as used herein, refers to the process of abstracting logical storage from physical storage. Each of the host-side servers employ different host-side virtualization strategies, which include a set of rules that govern how host-side storage objects are represented logically on the host-side server. The set of rules may be stored in memory of the host-side server.

One goal in storage resource management (SRM) is to have the ability to deliver peak resource utilization on a shared resource pool to thereby minimize wasted idle storage resources. Due to the competition among the various vendors to virtualize resources, most systems are not complete data center management solutions, resulting in computing environments that include multiple heterogeneous virtualization strategies that may not take full advantage the storage virtualization of the underlying storage system. Since the host-side file systems include one of multiple heterogeneous virtualization strategies, they are referred to herein as heterogeneous host-side servers. For example, a typical computing environment may include multiple heterogeneous host-side servers that utilize a storage system that employs a storage virtualization strategy that is different than the host-side virtualization strategies of the host-side servers. In conventional computing systems, a conventional data center environment may have a host-side server and a storage system, which are both separately managed by the server administrator and the storage administrator, respectively, such as illustrated in FIG. 1. The server administrator is responsible for managing the physical and software resources of one or more host-side servers. Part of those software resources is the server 10 stack (host-side file system, volume manager, virtual disks, NFS mounts, etc). The storage administrator, on the other hand, manages the physical and software resources of one or more storage systems, such as logical units of data (e.g., logical unit numbers (LUN), logical containers (e.g., volumes, aggregates, etc), and NFS exports). The server administrator has a set of challenges. The first is that the server 10 stacks are different and are there are no tools for effectively managing them as anything but distinct host-side file systems. The second is that the server IO stack is dependent on physical and software resources managed by a different administrative group, the storage administrator. As a result the server administrator is unable to exploit the virtualization value of centralized storage resources without involving the storage administrator. Although host-side storage objects can be manually mapped to storage objects in the storage system, conventional systems do not provide any tools to allow a server administrator to manage the data in the storage object without administrator interaction, such as by a storage administrator, at the storage system. For example, to perform an operation like a snapshot or a snapshot restore, the entire set of storage resources (e.g., storage objects) must be manipulated, requiring both human co-ordination and software that can map between the two sets of storage resources—the host-side storage resources of the host-side server and the storage resources of the storage system. A snapshot operation creates a copy of a set of files and directories as they were at a particular point in time.

For example, the conventional SRM tools require administrator interaction at the storage system to provision storage resources on the storage system. Conventional SRM tools, which may be used in such environments as described above, simply connect an initiator host bus adapter (HBA) to a target HBA in provisioning storage. That is, the server administrator notifies the storage administrator that a storage resource of a specified capacity is needed, and the storage administrator allocates the appropriate storage resource, notifying the server administrator of the target location for the particular storage resource. The target HBA of the storage resource in the storage system is then manually mapped to the initiator HBA of the storage resource on the host-side server using the SRM tool. The conventional SRM tools are not used to create and/or manage file system on the host-side server, nor create and/or manage the storage resources on the storage system, but to manually map the host-side storage objects using human coordinate between the server and storage administrators. Also, the conventional SRM tools do not provision storage according to the underlying storage system, and thus, do not take advantage of the benefits of the storage virtualization, such as thin provisioning and snapshot operations. Thin provisioning is a provisioning operation that allows space to be allocated to servers, on a just-enough and just-in-time basis, as compared to pre-allocating a large amount of space to account for possible data growth. Thin provisioning may be used in many applications where access to the same storage resource pool is used, allowing administrators to maintain space in the resource pool to service the data growth requirements of the many applications on an ongoing basis. Thin provisioning may allow organizations to purchase less storage capacity up front, and defer storage capacity upgrades with actual increase in usage. In contrast, in fat provisioning, typically large amounts of storage capacity are pre-allocated to individual applications. Most of the storage resources in fat provisioning remain unused (e.g., not written to), resulting in poor utilization rates.

Similarly, conventional SRM tools may not take advantage of such features of the underlying storage systems, such as snapshot operations. Snapshot operations may generate a copy of a set of files and/or directories as are at a particular point in time. As described above, to perform an operation like a snapshot or a snapshot restore, the entire set of storage resources (e.g., storage objects) must be manipulated, requiring both human co-ordination and software that can map between the two sets of storage resources—the host-side storage resources of the host-side server and the storage resources of the storage system.

Also, since the conventional provisioning tools in servers do not provision storage according to the underlying storage system, but are limited to provisioning storage according to their own specific virtualization strategy, the conventional provisioning tools do not provide a heterogeneous tool for multiple heterogeneous host-side servers that employ different virtualization strategies. Some other conventional systems attempt to provide tools for achieving end-to-end provisioning, however, these tools are limited to the specific virtualization strategy employed for the particular system, and do not allow centralized storage provisioning for multiple heterogeneous host-side servers that employ different virtualization strategies.

Also, since the conventional SRM tools do not provision storage according to the underlying storage system, the conventional SRM tools cannot detect and report out-of-space conditions, especially when there are storage-based snapshots and thin provisioning. From a traditional file system perspective, the storage space is entirely contained within the file system, but in a centralized file system of multiple heterogeneous host-side servers, the out-of-space conditions on the storage system need to be correlated to the out-of-space conditions on each of the host-side servers.

SUMMARY OF INVENTION

Centralized management of both host-side storage objects on multiple heterogeneous host-side servers and logical data containers on a storage system is performed by a management server. The management server centrally manages the host-side storage objects and the logical data containers according to the respective virtualization strategies. By centrally managing both the host-side storage objects and the logical data containers, the management server may take advantage of the underlying storage virtualization of the storage system, such as by provisioning a logical data container on the storage server without administrator interaction at the storage system, or performing a snapshot operation without administrator interaction at the storage system. Also, by centrally managing both the host-side storage objects and the logical data containers, the management server may centrally monitor for out-of-space events in the storage system and automatically correlated the out-of-space events in the storage system to out-of-space events for the corresponding host-side file systems.

BRIEF DESCRIPTION OF THE DRAWINGS

The present invention is illustrated by way of example, and not by way of limitation, in the figures of the accompanying drawings.

DETAILED DESCRIPTION

The embodiments described herein are directed to solving the data center resource optimization problems described above, namely server storage resource optimization and management by integrating with the various host-side virtualization strategies employed on the various host-side servers and the storage virtualization strategy employed by the underlying storage system. As described above, the host-side virtualization strategies each include a set of rules that governs how the host-side storage objects are logically represented on the host-side server, whereas a storage virtualization strategy includes a set of rules that governs how the logical data containers and/or logical units of data are logically represented on the storage system. The set of rules for the host-side virtualization strategies may be stored in memory on the respective host-side servers, and the set of rules of the storage virtualization strategy may be stored in memory on the storage system. For example, when an operating system of one of the host-side servers receives a request to create a host-side file system, the operating system may create the host-side file system according to the set of rules stored in memory. Similarly, when a storage system receives a request to create a file system, the operating system of the storage system may create the file system according to the set of rules stored in memory. The embodiments described herein allow data centers to use storage virtualization available on the storage system, regardless of the host-side virtualization strategy that is being used to virtualize other resources in the system. The embodiments described herein allow centrally managing the underlying storage objects from a host-side perspective without the storage administrator. The embodiments described herein are able to centrally manage the server 10 stack across multiple heterogeneous servers, and to use storage virtualization without requiring coordination with the storage administration staff (e.g., without administrator interaction at the storage system).

Figure 1:
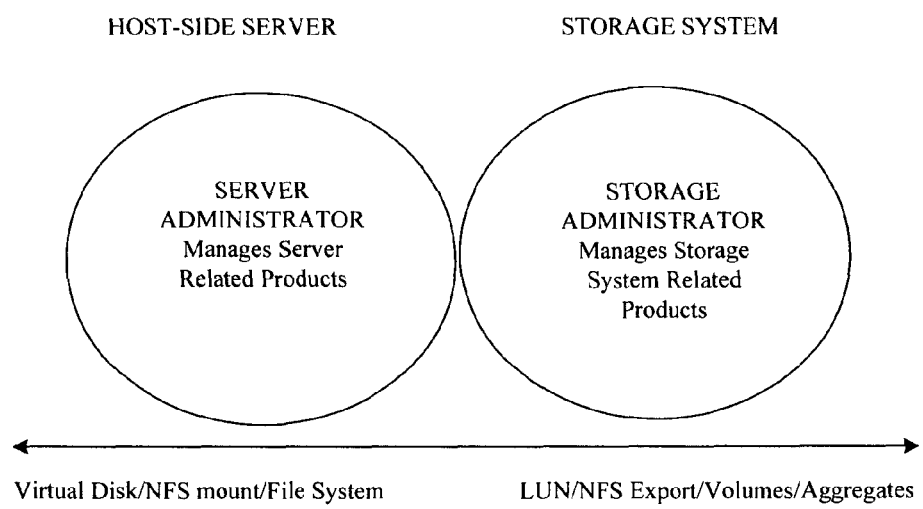
FIG. 1 illustrates a conventional data center environment having a host-side server and a storage system, which are separately managed by a server administrator and a storage administrator, respectively.
Figure 2:
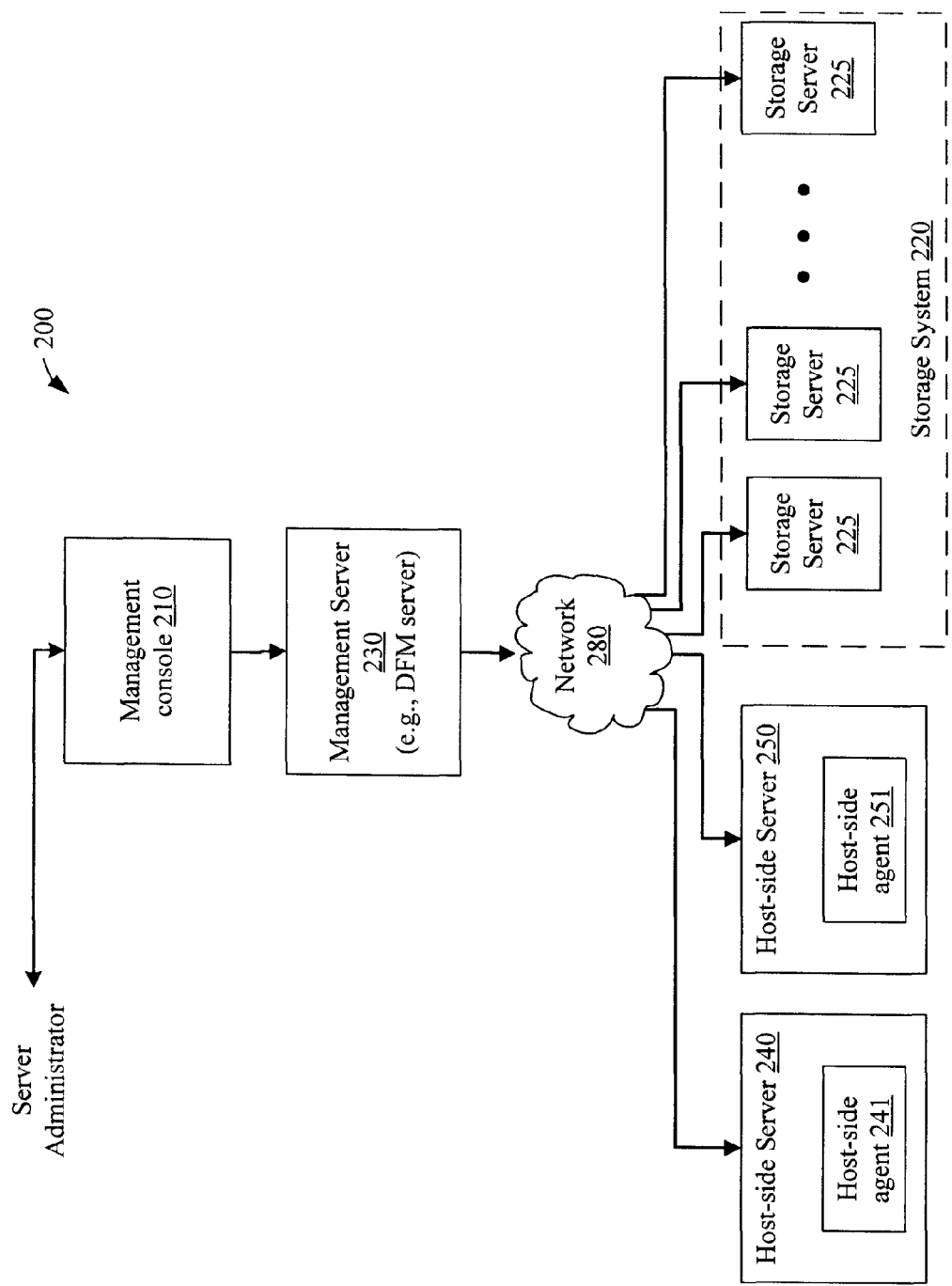
FIG. 2 illustrates a block diagram of one embodiment of a computing system having a management server coupled to multiple host-side servers and a storage system over a network.

FIG. 2 illustrates a block diagram of one embodiment of a computing system 200 having a management server 230 coupled to multiple host-side servers 240-250 and a storage system 220 over a network 280. The computing system 200 includes a management console 210, generated by the management server 230). The server administrator may use the management console to centrally manage the host-side virtualization on the host-side servers 240 and 250 and the storage virtualization on the storage system 220. The management of the storage virtualization and/or the host-side virtualization may be done automatically without administrator interaction at the storage system 220 and/or host-side servers 240 and 250. The management console 210 receives user input from a server administrator and displays storage management information to the server administrator. In one embodiment, the management console 210 is a web-based console. The server administrator may access the management console 210 over a network, such as the Internet, from a workstation (not illustrated) within an organization's Local Area Network (LAN) to view storage management information and to perform various storage management operations, such as storage provisioning, snapshot operations, or the like. The management console 210 may also be accessed from one of the host-side servers 240 and 250.

The storage system, 220 may include one or more storage servers and one or more storage devices. The storage devices may be, for example, conventional magnetic disks, optical disks such as CD-ROM or DVD based storage, magneto-optical (MO) storage, or any other types of non-volatile storage devices suitable for storing large quantities of data. The storage devices in the storage devices 4A and 4B can be organized as one or more RAID groups, in which ease the nodes 2A and 2B access the storage devices 4A and 4B using an appropriate RAID protocol.

The management server 230 communicates with the management console 210 through a first interface, and receives user input from the management console 210, such as request to perform various storage management operations. The management server 230 may also perform storage management operations without administrator interaction from the server administrator. The management server 230 communicates with the storage system 220 over the network 280 through a second interface to centrally manage the logical data container (e.g., LUNs, volumes, aggregates, or the like) in the storage system 220. The management server 230 communicates with the multiple host-side servers 240 and 250 over the network 280 through a third interface. The management server 230 centrally manages the host-side storage objects of the heterogeneous host-side servers through the third interface. The storage system 220 employs a storage virtualization strategy, and each of the host-side servers employs a different host-side virtualization strategy. For example, the host-side server 240 operates a first operating system having a first host-side virtualization type, and the host-side server 250 operates a second operation system having a second host-side virtualization type. It should be noted that the management server 230 communicates with both the storage system and the multiple host-side servers 240 and 250 over the same network 280. In other embodiments, the management server 230 may communicate with the storage server 220 and the multiple host-side servers 240 and 250 over more than one network. In one embodiment, the network 280 is a LAN. Alternatively, the network 280 may be a metropolitan area network (MAN), a virtual private network (VPN), a wide area network (WAN), a global area network (GAN) such as the Internet, or other types of network or combination of networks.

The management server 230, as part of centrally managing both the logical data containers and the host-side storage objects, may provision a logical data container in the storage system as a host-side storage object in the host-side file system residing on one of the host-side servers (e.g., client-based servers) without administrator interaction at the storage system 220. The management server 230 receives a request to provision the logical data container for the host-side storage object and sends a request to the storage system through the second interface to provision the logical data container. The management server 230 then provisions the host-side file system on the particular host-side server through the first interface based on the provisioning information from the storage system 220.

In another embodiment, the management server 230 includes a SRM tool to coordinate end-to-end storage provisioning of the host-side storage objects of the heterogeneous host-side servers homogeneously with respect to the storage arrays of the storage system. The SRM tool allows an administrator, via the management console, to manage virtualization of the host-side file systems according to the different host-side virtualization strategies, and to manage virtualization of the storage system 220 according to the storage virtualization strategy to coordinate the end-to-end provisioning of the host-side storage object. This centralized management of both types of virtualization may be performed without administrator interaction at the storage system and/or at the host-side servers. The host-side management may be done by communicating with a host-side agent residing on each of the host-side servers, which can manipulate the host-side storage objects on the respective host-side file system. In one embodiment, host-side agents 241 and 251 reside on the host-side servers 240 and 250, respectively. As described in more detail below in conjunction with FIG. 4, a monitoring manager (e.g., a distinct process performed by the management server 230) communicates with the host-side agents 241 and 251 to centrally manage the host-side storage objects on the host-side servers 240 and 250. The host-side storage objects may be manipulated by the host-side agents 241 and 251.

The management server 230 centrally manages both the host-side storage objects of multiple heterogeneous, host-side servers and the logical data containers on the storage system without administrator interaction at the storage system. The management server 230 may automatically provision a logical data container on the storage server according to the storage virtualization without administrator interaction at the storage server, for example, upon receiving a request to provision the logical data container. This may be done by automatically sending a request to the storage system to automatically allocate the logical data container on the storage system which corresponds to the respective host-side storage object according to the storage virtualization strategy without administrator interaction at the storage system. The logical data container may be thinly provisioned. The request to provision the logical data container may originate from the server administrator through the management console 210. Alternatively, the request may originate from a user on one of the multiple host-side servers, in response to a request to provision a host-side storage object. In another embodiment, the management server 230 may also automatically provision a host-side storage object or a host-side file system on one of the host-side servers, which corresponds to the provisioned logical data container on the storage system without administrator interaction at the host-side server.

The management server 230, as part of centrally managing both the host-side storage objects and the logical data containers, may also perform other storage operations to take advantage of the storage virtualization on the storage system 220. In one embodiment, the management server 230 automatically performs a snapshot operation on the logical data containers on the storage system 220 according to the storage virtualization strategy. This may be done by sending a request from the management server 230 to the storage system 220 to perform the snapshot operation. The management server 230 interacts with the storage system 220 directly, without administrator interaction at the storage system 220, to perforin the operations. The request to perform the snapshot operation may originate from the server administrator through the management console 210. Alternatively, the request may originate from a user on one of the multiple host-side servers.

Figure 3A:
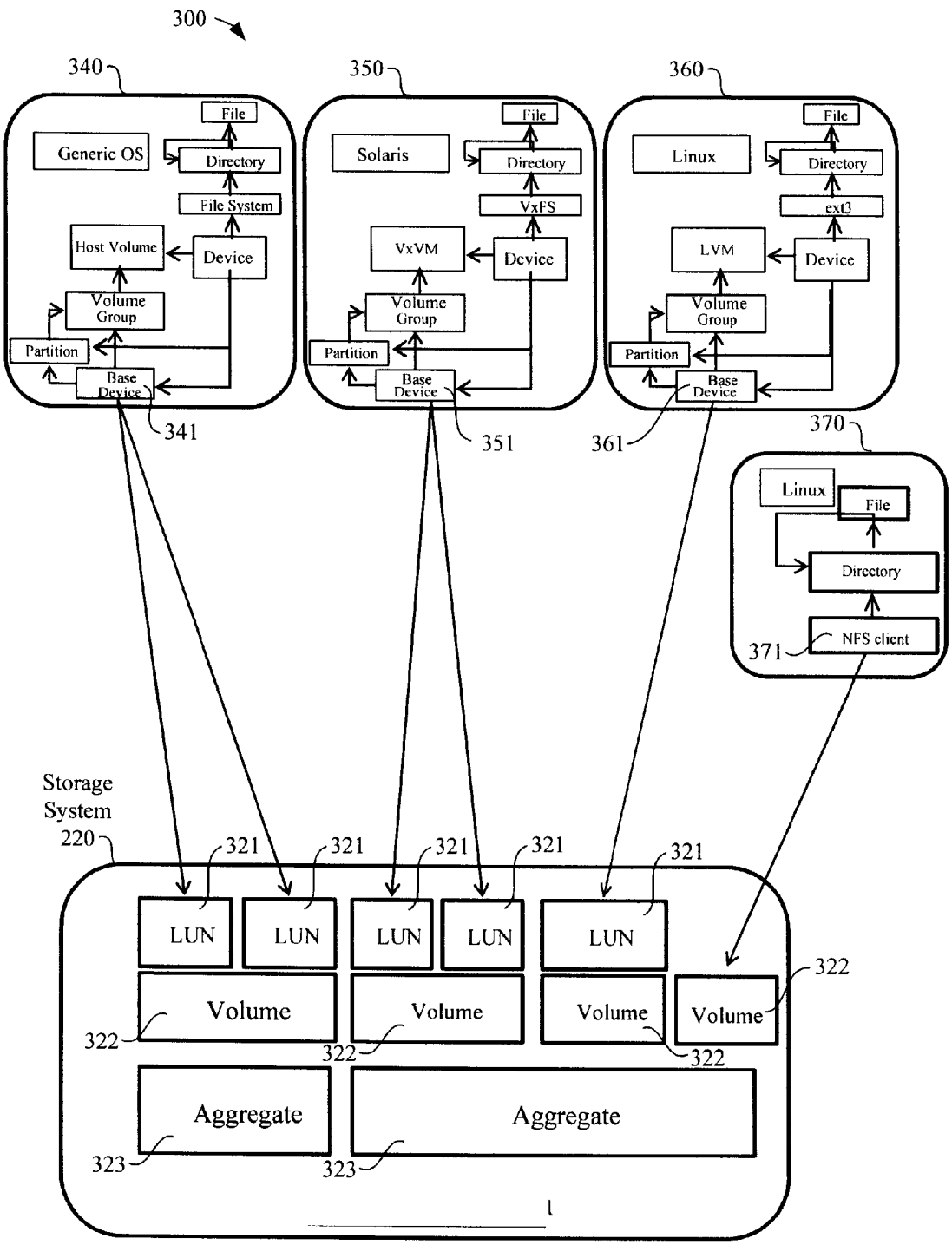
FIG. 3A illustrates an exemplary storage resource model created by the management server, which centrally manages objects of the exemplary storage resource model, according to one embodiment.
Figure 3B:
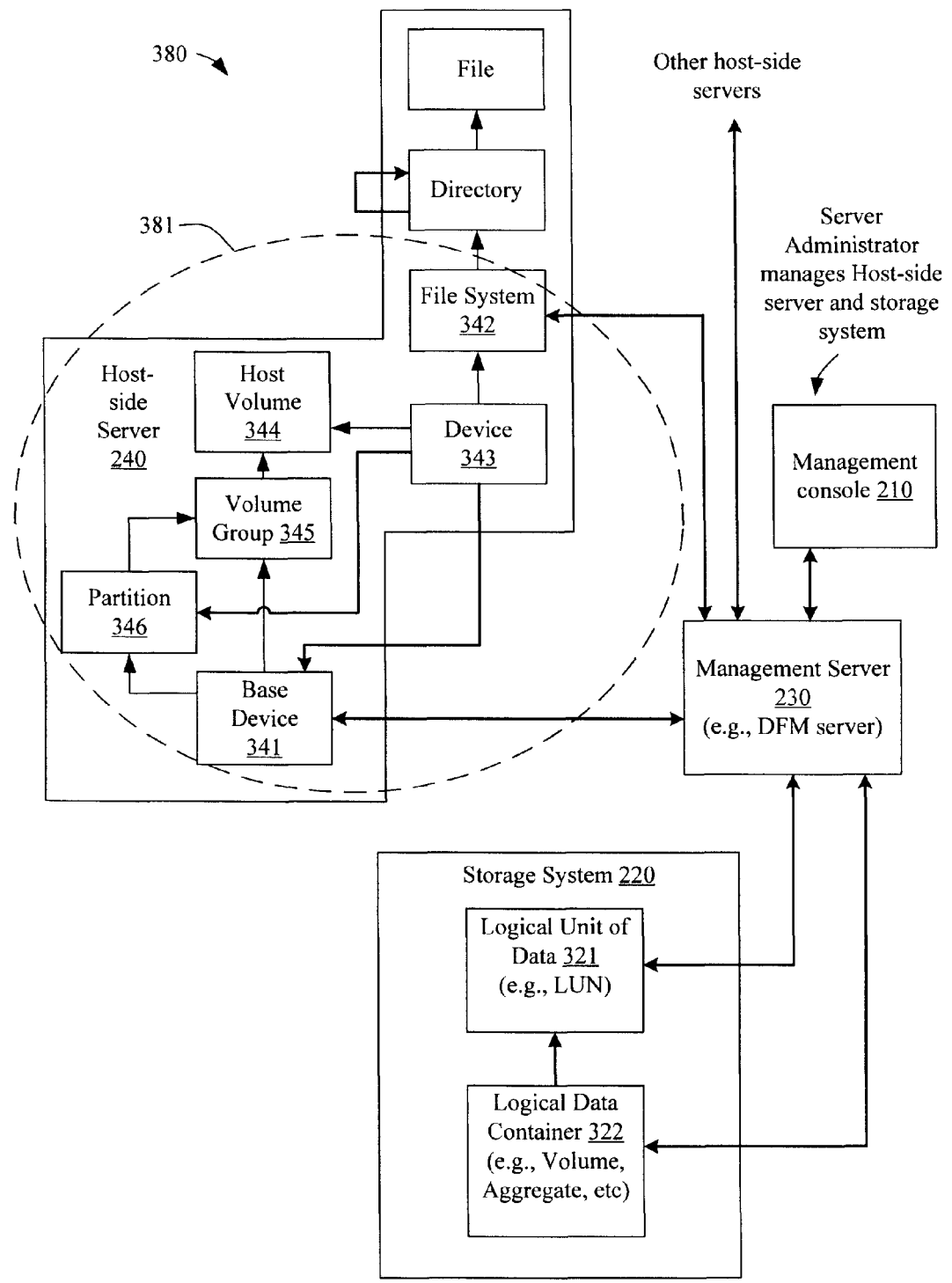
FIG. 3B illustrates one embodiment of a data center environment having one of the host-side servers and the storage system, which are centrally managed by a server administrator through the management server without administrator interaction at the storage system.

The management server 230 may manage a server stack across the multiple host-side server (e.g., 240 and 250), as well as utilize the storage virtualization strategy to provision a logical data container in the storage system for each file system of the multiple host-side servers. The management server 230 centrally manages the host-side storage objects and the logical data containers using a storage resource model, such as illustrated in FIGS. 3A and 3B. The storage resource model is an abstract model that describes how the storage and server storage resources are connected to each other as a graph. In particular, the storage resource model represents how the host-side storage objects in the multiple heterogeneous host-side servers are connected to the logical data containers on the storage system 220. The storage resource model abstracts out the details of the storage and presents the storage in the form of a graph, which can be used to build a variety of solutions for centrally managing both the storage resources on the storage system 220 and the host-side storage resources on the multiple host-side servers 240 and 250. The storage resource model may be a single manageable entity, which is a first class object rather than just a collection of distinct objects. The object defines the object relationships of how various host-side resources and storage resources are connected to each other. In one embodiment, using the storage resource model, the management server 230 permits the server administrator to perform various operations, such as provisioning operations, snapshot operations, snapshot restore operations, or the like, as well as monitor the health and status of the storage resource model.

It should be noted that host-side virtualization strategies typically use specific device drivers, which present physical disks or logical storage to the host-side server. Typically, a software layer above the physical device drive intercepts the I/O requests performing the meta-data lookup and I/O redirection. Essentially every operating system has its host-side virtualization. These virtualization tasks are performed by a logical volume manager (LVM), such as in Unix- and Linux-based systems, or a logical disk manager (LDM), such as in the Windows-based systems. These different managers employ different host-side virtualization strategies, depending on the platform type of the host-side server. These host-side virtualization strategies optimize storage utilization only a per host basis, and the software for implemented the virtualization strategy is unique to the particular type of host.

In one embodiment, the host-side virtualization strategy uses a file-based access protocol, such as the Common Internet File System (CIFS) protocol or Network File System (NFS) protocol, over TCP/IP when accessing information in the form of files and directories. In another embodiment, the host-side virtualization strategy uses a block-based access protocol, such as the Small Computer Systems Interface (SCSI) protocol encapsulated over TCP (iSCSI) and SCSI encapsulated over Fibre Channel Protocol (FCP), when accessing information in the form of blocks. In one embodiment, the storage virtualization strategy is a storage device-based virtualization. In another embodiment, the storage virtualization strategy is a network-based virtualization. The network-based virtualization may be implemented in a storage system having a SAN architecture. The SAN architecture allows remote computer storage devices (such as disk arrays, tape libraries, or the like) to host-side servers in such a way that, to the host-side operating system, the devices appear as locally attached, using for example, the Fibre Channel (FC) protocol. Alternatively, the storage system may have a NAS architecture, which uses file-based protocols such as NFS or Server Message Block (SMB) (also referred to as CIFS) where it is clear that the storage is remote, and computers request a portion of an abstract file rather than a disk block. Whether the storage system is NAS or SAN, storage virtualization refers to the process of completely abstracting logical storage from physical storage. The physical storage resources may be aggregated into storage pools, from which the logical storage is created. The storage system may present to the client (e.g., host-side server) a logical space for data storage, and may transparently handle the process of mapping it to the actual physical location. The storage system may virtualize multiple disk arrays, made by different vendors, scattered over the network, into a single monolithic storage device, which can be managed uniformly.

FIG. 3A illustrates an exemplary storage resource model 300 created by the management server, which centrally manages objects of the exemplary storage resource model 300, according to one embodiment. The storage resource model 300 represents how host-side storage objects 341-371 of multiple host-side servers 340-370 connect to logical data containers 321 and 322 on the underlying storage system 220. The host-side server 340 is representative of a host-side server that operates a generic operation system. The host-side server 340 employs a first host-side virtualization strategy that uses various objects to represent the files and directories of a host-side file system. The storage administrator provisions a LUN to the host. The server administrator mounts the LUN as a base device, which may be partitioned. Each of the partitions may be assembled into a volume group as a collection of raw storage. A logical volume manager is then used to create a logical volume inside of the volume group. New file-systems are then created within the logical volume. Using the generic operating system, the host-side storage object is represented by a base device 341. In one embodiment, the base device 341 is represented as a mounted disk drive (e.g., "D:" drive) or root directory. The storage resource model 300 maps the base device 341 to one or more LUN 321 (e.g., logical data container) on the underlying storage system 220.

The host-side server 350 is representative of a host-side server that operates the Unix-based operating system. The host-side server 350 employs a second host-side virtualization strategy, which is different than the first, and which uses various objects to represent the files and directories of a host-side file system (e.g., VxFS). The storage administrator provisions a LUN to the host. The server administrator mounts the LUN as a base device, which may be partitioned. Each of the partitions may be assembled into a volume group as a collection of raw storage. VxVM is then used to create a VxVM volume inside of the volume group. A VxFS file system is then created within the VxVM volume. Using the Unix-based operating system, the host-side storage object is represented by a base device 351. In one embodiment, the base device 351 is represented as a mounted root directory (e.g., "/root), such as in file systems of the Unix-based operating system. The storage resource model 300 maps the base device 351 to one or more LUN 321 (e.g., logical data container) on the underlying storage system 220.

The host-side server 360 is representative of a host-side server that operates the Linux operating system. The host-side server 360 employs a third host-side virtualization strategy, which is different than the first and second, and which uses various objects to represent the files and directories of the host-side server 360. The storage administrator provisions a LUN to the host. The server administrator mounts the LUN as a base device, which may be partitioned. Each of the partitions may be assembled into a volume group as a collection of raw storage. LVM is then used to create a logical volume inside of the volume group. A new ext3 file system is then created thin within the LVM. Using the Linux operating system, the host-side storage object is represented by a base device 361. In one embodiment, the base device 361 is represented as a mounted root directory (e.g., "/root), such as in file systems of the Linux operating system. The storage resource model 300 maps the base device 361 to one or more LUN 321 (e.g., logical data container) on the underlying storage system 220.

The host-side server 370 is representative of a host-side server that also operates the Linux operating system, but employs a fourth host-side virtualization strategy, which is different than the first, second and third, and which uses a NFS client 371 as the host-side storage object to represent the files and directories of the host-side server 370. Unlike the host-side servers 340, 350, 360 where the file system is contained within the host-side server, using NFS, the file-system may be implemented in the storage server. The host-side server connects to the file-system using an NFS client. As a result, some of the host-side storage objects within the host-side servers may not be necessary. Instead, those logical objects may exist reside of the storage system 220. The storage resource model 300 maps the NFS client 371 to a volume 322 (e.g., logical data container) on the underlying storage system 220. The storage system 220 may have a file system which is created within the volume. A volume is a logical data set which is an abstraction of physical storage, combining one or more physical storage devices or parts thereof into a single logical data container (e.g., data storage object), and which is managed as a single administrative unit, such as a single file system. Typically, file systems have a one to one mapping to volumes where volumes can be constructed from one or more storage devices (e.g., disks). Each volume is generally, although not necessarily, managed as a separate file system. Each volume stores a copy of a data set, and each node has its own data sets as well as has access to the other node's data sets. The volume may be made up of one or more LUNs, and the volume may be part of an aggregate having one or more volumes. In the depicted embodiment of FIG. 3A, the storage virtualization strategy uses multiple aggregates 323, which include one or more volumes 322, which include one or more LUNs 321. In other embodiments, more or less layers of abstraction may be used, and other types of logical data containers may be used.

FIG. 3B illustrates one embodiment of a data center environment 380 having one of the host-side servers 240 and the storage system 220, which are centrally managed by a server administrator through the management server 230 without administrator interaction at the storage system 220. In this embodiment, the server administrator centrally manages the host-side server 240 and the storage system 220. In one embodiment, the server administrator, through the management console 210 can request that a new file system 342 be provisioned on the host-side server 240. The request may include the storage capacity of the file system, such as 500 gigabytes (GB), and may indicate which storage server in the storage system to store the file system (e.g., "Filer G"). The management server 230 may find available space on the designated storage server (e.g., "aggregate 3"), and send a request to the storage system 220 to create a volume 322 on the designated aggregate 323. The management server 230 can then send a request to the host-side agent 241 to provision the file system on the host-side server 240, corresponding to the created volume 322 on the storage system 220. The host-side agent 241 sends a request to the storage system to provision a LUN 321 having the specified storage capacity on the specified volume 322. The host-side agent 241 then mounts the LUN 321 as the base device 341 (e.g., "D:" drive) and create the file system 342. In one embodiment, the base device 341 is presented as a disk (e.g., "D:" drive) in the host-side file system. In another embodiment, the base device 341 may be a volume manager, such as in a Unix-based system. The host-side agent 241 may notify the management server 230 that the base device 341 (e.g., "D:" drive) has been created on the host-side server 240 and the management server 230 may indicate to the server administrator that the file system 342 was created. The management server 230, using a storage resource model, maps the base device 341 to the LUN 321 and the file system 342 to the volume (e.g., logical data container). In one embodiment, the host-side agent 241 creates the storage resources, indicated by the dashed circle 881. The file system 342 corresponds to the device 343, which is part of the host volume 344, which is part of the volume group 345. The base device 341 may correspond to the partition 346 of the volume group 345. Although the embodiment of FIG. 3B illustrates how the management server 230 centrally manages the host-side storage objects (e.g., base device 341 and file system 342) of the host-side server 240 and the logical units of data and logical data containers (e.g., LUN 321, and logical data container 322) on the storage system 220, the management server 230 also manages other host-side storage objects on multiple heterogeneous host-side servers, which employ different host-side virtualization strategies than that of the host-side server 240.

The management server 230 may implement a data fabric manager (DFM) server, as described in more detail below in conjunction with FIG. 4.

Figure 4:
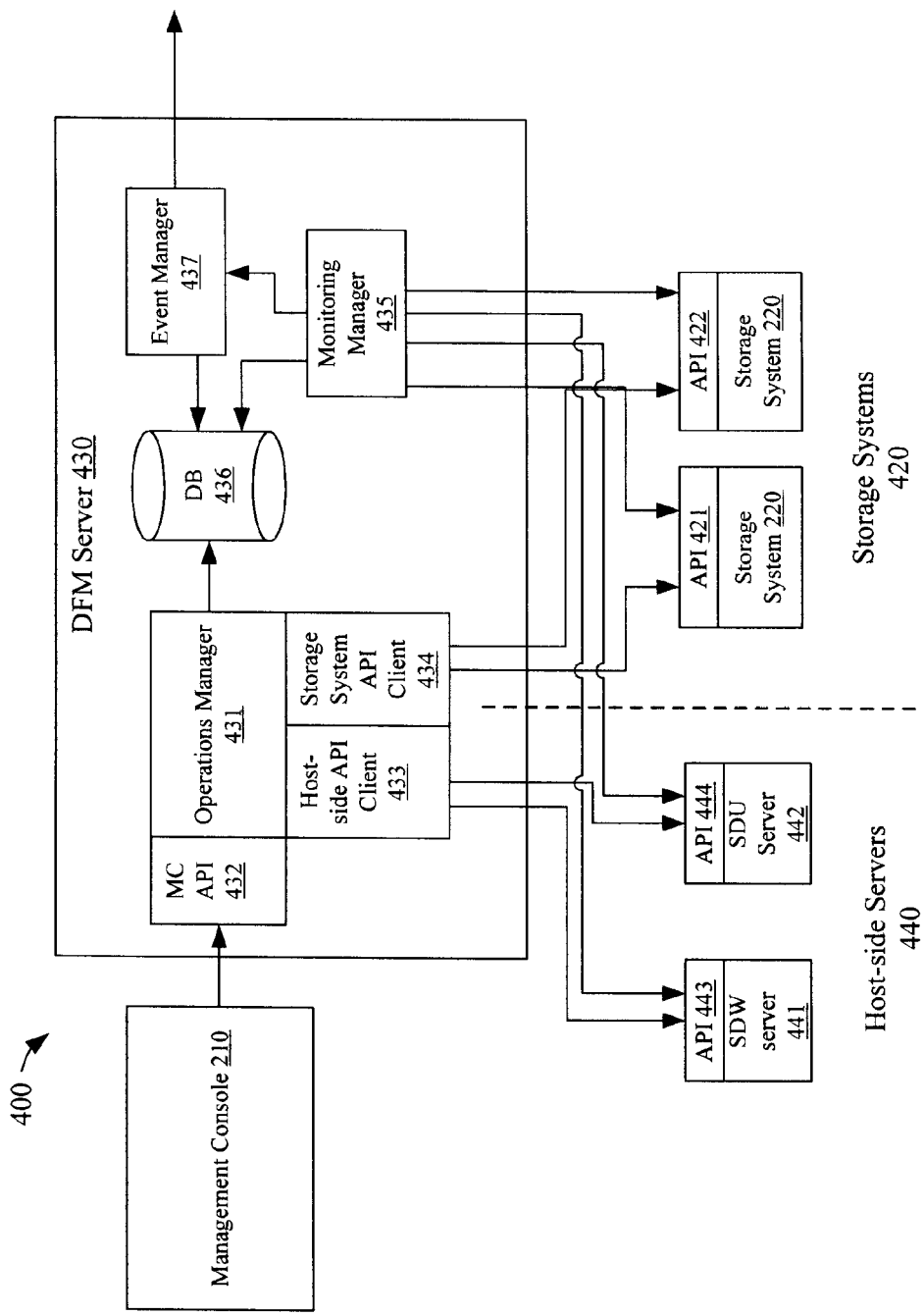
FIG. 4 is a block diagram of a storage resource management tool having a data fabric manager (DFM) server and host-side agents residing on the host-side servers.

FIG. 4 is a block diagram of a storage resource management tool 400 having a DFM server 430 and host-side agents 441 and 442 residing on the host-side servers 440. The management console 210 communicates with the DFM server 430. The management console 210 is a client of the DFM server 430. The server administrator manages the storage resources and the host-side storage resources using the DFM server 430 through the management console 210. The management console 210 may include one or more user interfaces, such as graphical user interfaces (GUIs), command line interfaces (CLIs), web-based user interfaces, or the like.

The DFM server 430 may provide the ability to restrict access to storage resources and the ability to have a consolidated view of all of the server 10 resources. The unified view of the server storage resources may be provided through a management console, which includes a new abstraction for host storage resources. Using the host-side agents 241 and 251 on the heterogeneous host-side servers, the DFM server 430 can centrally manage both the storage objects in the storage system and the corresponding host-side storage objects. The management server allows a server to optimally provision storage for multiple heterogeneous host-side servers in a way to take advantage of the underlying storage virtualization. The management server may centrally provision host-side storage objects, such as host-side file systems, across many heterogeneous hosts (e.g., hosts implementing heterogeneous operating system, such as Windows, Linux, Solaris operating systems, or the like. The DFM server may also centrally provision logical data containers on the storage system to correspond to the host-side storage objects without administrator interaction at the storage system. The DFM server may also perform a snapshot operation on logical data containers on the storage server according to the storage virtualization strategy without administrator interaction at the storage system upon receiving user input from a user on the management server.

The DFM server 430 includes an operations manager 431, which communicates with the management console 210 via the management console (MC) application programming interface (API) 432, with the host-side servers 440 via the host-side API client 433, and with the storage systems 420 through the storage system API client 434. The host-side API client 433 communicates with the host-side agents 241 and 251, as described above. In this embodiment, the host-side agents are host-side agents for the Windows operating system (SDW) 441, and for the Unix operating system (SDU) 442. The SDW servers 441 and SDU servers 442 communicate with the DFM server 430 through the APIs 443 and 444, respectively. The SDW server 441 and SDU server 442 each provides a layer of abstraction between an application running on the host-side servers 440 and the underlying storage system 220. In one embodiment, the application may use virtual disks (e.g., LUNs) on the storage system, as if they were locally connected drives or mount points. The SDW server 441 and SDU server 442 allow the host-side servers 440 to take advantage of the storage virtualization strategies of the underlying storage system 220, such as snapshot operations, flexible volumes, cloning, space management technologies, and the like. The SDW server 441 and SDU 442 allow the DFM server 430 (e.g., operations manager 431) to manipulate host-side storage objects (e.g., raw devices, files, base devices, file systems, or the like).

The SDW server 441 and SDU 442 may perform various operations, such as create, destroy, snapshot, remote copy, and clone operations of any host-side storage objects. The operations manager 431 can also manipulate storage objects on the storage systems 420 through the storage system API client 434. Each storage system 220 communicates with the DFM server 430 through the APIs 421 and 422. The operations manager 431, acting as an API server, centrally manages both the host-side storage objects on the host-side server 440 and the storage resources (e.g. logical data containers, logical units of data, etc) on the storage system 420. The operations manager 431 may also be used to define global roles, data protection polices, provisioning policies, or the like. The operations manager 431 communicates with the DFM database 436, which is a data store that stores, for example, information regarding each object in the storage resource model, information regarding global roles, data protection policies, and provisioning policies, access information, information regarding discovered host-side agents, information regarding the health and status of each of the host-side agents, monitoring results from the monitoring manager 435 (described below), such as out-of-space events, or the like. The DFM database 436 may also store configuration information, as well as historical information. The data of the DFM database 436 may be stored according to a data schema, such as a relational database having multiple tables.

The monitoring manager 435 communicates with the SDW server 441, the SDU server 442, the storage systems 420 using API 443, 444, 421, and 422, respectively. The monitoring manager 435 performs centralized monitoring of the host-side storage objects on the host-side server 440 and the storage resources on the storage systems 420. The monitoring manager 435 may discover host-side agents (e.g., SDW and SDU servers) and host-side storage objects. All discovered resources may be stored in the DFM database 436. As the status of the resources changes, the resources may be updated in the DFM database 436. The monitoring manager 435 may also monitor other items, such as operational status of a server, provisioned LUNs, file systems, host volumes, disk groups, NFS exports, the LUNs backed up by snapshots, the HBA status, or the like. The monitoring manager 435 may also monitor various thresholds on both the host-side servers 440 and the storage systems 420, such as the volume space reservation threshold, the volume out-of-space threshold, the volume nearly-full threshold, the host-side file system out-of-space threshold, the host-side file system nearly-full threshold, or the like. It should be noted that each of the host-side agents may generate events about the status of the host-side storage objects and report them to the monitoring manager 435, when they are detected or upon request from the monitoring manager 435.

The event manager 437 communicates with the monitoring manager 435 and the DFM database 436. When certain events are detected by the monitoring manager 435, the event manager 437 may store the event in the DFM database 436 and/or perform some action, such as notifying the host-side servers, the management console 210, or a third-party management console of the detected event. For example, the event manager 437 may generate an email when triggered by a particular type of event. The policies regarding the event notification may be stored in the DFM database 436.

In one embodiment, the various blocks of the DFM server 430 represent a collection of distinct processes that run on a single management server. Alternatively, the various blocks of the DFM server 430 represent a combination of hardware and software components for centrally managing the host-side storage resources on the host-side servers 440 and the storage resources on the storage systems 430.

Figure 5:
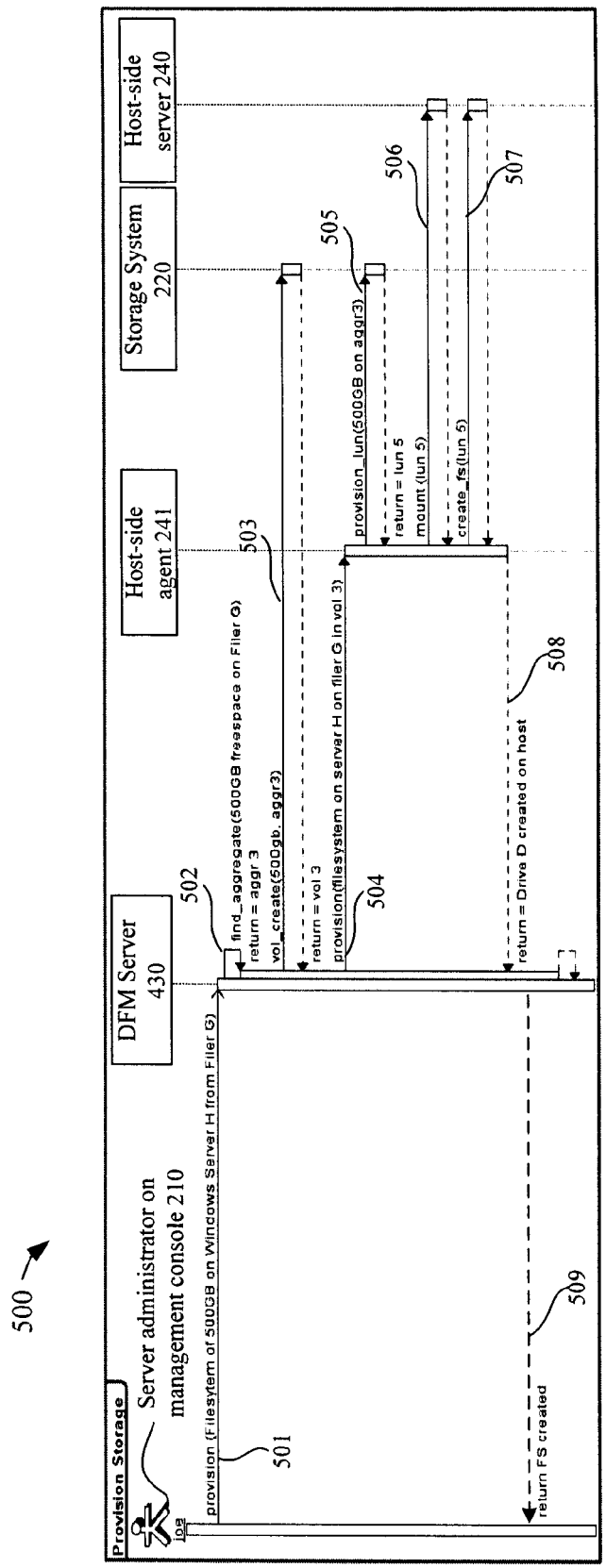
FIG. 5 is a sequence diagram of a method for performing a storage provisioning operation on a host-side server and on a storage system, according to one embodiment.

FIG. 5 is a sequence diagram of a method 500 for performing a storage provisioning operation on a host-side server and on a storage system, according to one embodiment. The method 500 starts by the server administrator, through the management console 210, requesting that a new file system be provisioned on the host-side server 240 (e.g., Windows server H), operation 501. The request may include the storage capacity of the file system, such as 500 gigabytes (GB), and may indicate which storage server in the storage system to store the file system (e.g., "Filer G"). It should be noted that although the depicted embodiment uses a filer, in other embodiments, other types of storage servers may be used. The DFM server 430, upon receiving a request to provision a host-side storage object (e.g., a host-side file system) on the host-side server 240, employing a host-side virtualization strategy, provisions storage on the storage system to correspond to the host-side storage object. In order to provision a logical data container on the storage system, which employs a storage virtualization strategy, the DFM server 430, finds available space on the designated storage server (e.g., "aggregate 3"), operation 502, and sends a request to the storage system 220 to create a logical data container (e.g., volume 322) in the designated available space (e.g., "aggregate 3"), operation 503. Once the storage system 220 notifies the DFM server 430 that the logical data container is created (e.g., "return=vol 3"), the DFM server 430 can send a request to the host-side agent 241 to provision the file system on the host-side server 240, corresponding to the created logical data container (e.g., "volume 3") on the storage system 220, operation 504. The host-side agent 241, upon receiving the request in operation 504, sends a request to the storage system 220 to provision a logical unit of data (e.g., "LUN 5") having the specified storage capacity within the created logical data container (e.g., "volume 3"), operation 505. Once the storage system 220 notifies the host-side agent 241 that the logical unit of data is created (e.g., "return=LUN 5"), the host-side agent 241 mounts the logical unit of data (e.g., "LUN 5") as the base device 341 (e.g., "D:" drive), operation 506, and creates the host-side file system 342 for the base device 341, operation 507. In one embodiment, the base device 341 is presented as a disk (e.g., "D:" drive) in the host-side file system. In another embodiment, the base device 341 may be a mounting point. In another embodiment, the base device 341 may be a volume manager, such as in a Unix-based system. Once the host-side agent 241 has created the host-side file system 342, the host-side agent 241 notifies the DFM server 430 that the base device 341 (e.g., "D:" drive) was created on the host-side server 240, operation 508. The DFM server 430 may update the DFM database 436 to include the newly created storage resources. Once the host-side agent 241 has notified the DFM server 430 of the base device creation, the DFM server 430 notifies the server administrator, through the management console, that the host-side file system is created, operation 509. It should be noted that the operations 504, 506, 507, and 508 may be performed without administrator interaction at the host-side server 240, and the operations 503 and 505 may be performed without administrator interaction at the storage system 220.

In one embodiment, the host-side storage object is a host-side file system. In another embodiment, the host-side storage object is a base device. Alternatively, the host-side storage object may be other types of host-side storage resources. In one embodiment, logical data containers may be thinly provisioned logical data containers. In one embodiment, the logical data container is a flexible volume. Alternatively, the logical data containers may be fat provisioned data containers. Although the embodiment of FIG. 5 illustrates that request to perform storage provisioning originates from the management console 210, in other embodiments, the request may originate from a user on the host-side server 240.

Figure 6:
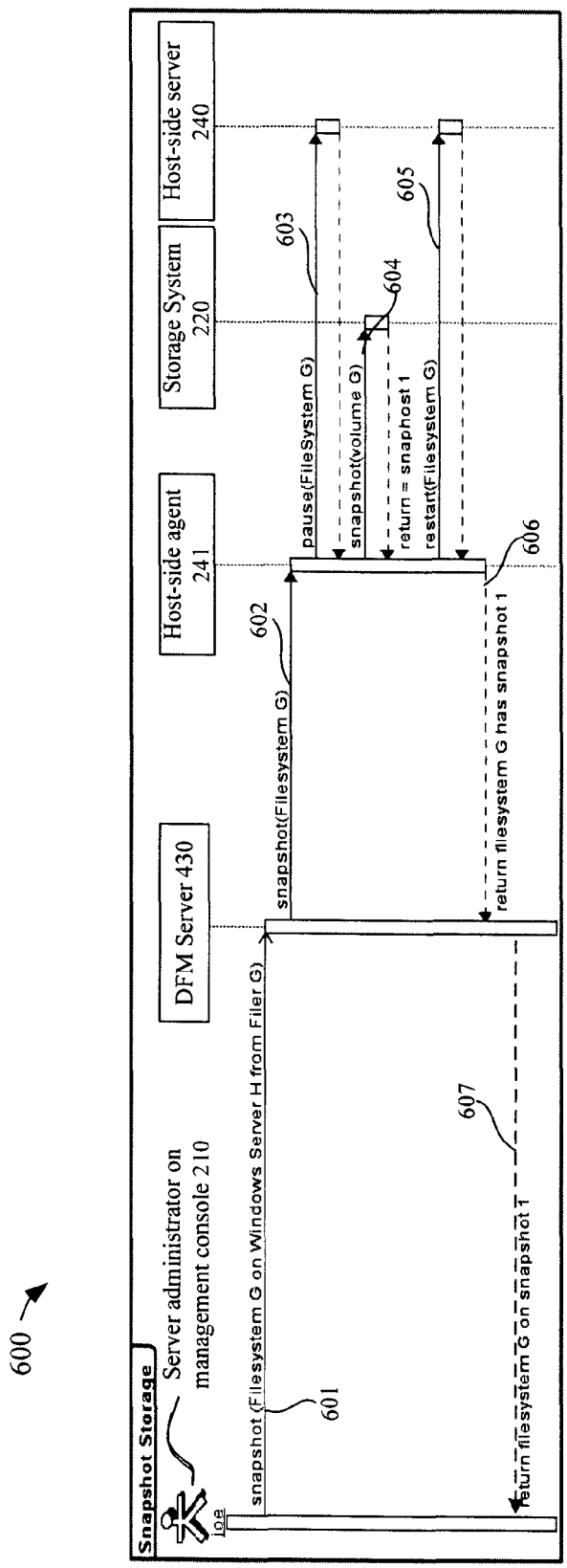
FIG. 6 is a sequence diagram of a method for performing a snapshot operation according to one embodiment.

FIG. 6 is a sequence diagram of a method 600 for performing a snapshot operation according to one embodiment. The method 600 starts by the server administrator, through the management console 210, requesting that a snapshot operation be performed on the host-side file system (e.g., "file system G") on a designated host-side server 240 (e.g., Windows server H), operation 601. The request may indicate which storage server corresponds to the host-side file system (e.g., "Filer G"), however, in other embodiments, the DFM server 430 may determine the particular storage server that corresponds to the host-side file system, for example, by performing a lookup operation in the DFM server database 436. The DFM server 430, upon receiving a request to perform the snapshot operation, sends a request to the host-side agent 241 (e.g., SDW server) to perform a snapshot operation on the host-side file system (e.g., "file system G"), operation 602. Upon receiving the request from the DFM server 430, the host-side agent 241 sends a request to the host-side server 240 to pause the host-side file system, operation 603. Once the host-side server 240 notifies the host-side agent 241 that the host-side file system is paused, the host-side agent 241 sends a request to the storage system 220 to take a snapshot of the logical data container (e.g., volume G) which corresponds to the host-side file system, operation 604. Once the storage system 220 notifies the host-side agent 241 that the snapshot has been taken (e.g., "return=snapshot 1"), the host-side agent 241 sends a request to the host-side server 240 to restart the host-side file system, operation 605, and notifies the DFM server 430 that the snapshot of the host-side file system has been taken, operation 606. The DFM server 430 may update the DFM database 436 to record the event of the snapshot of the host-side file system. Once the host-side agent 241 has notified the DFM server 430 of the snapshot, the DFM server 430 notifies the server administrator, through the management console 210, that a snapshot of the host-side file system has been taken, operation 607. It should be noted that the operations 602, 603, 605, and 606 may be performed without administrator interaction at the host-side server 240, and the operation 605 may be performed without administrator interaction at the storage system 220.

Although the embodiment of FIG. 6 illustrates that request to perform a snapshot operation originates from the management console 210, in other embodiments, the request may originate from a user on the host-side server 240.

Storage administrators may need a technique to define and limit the amount of storage that is used by individuals who have access to a shared data storage resource. The administrator may wish to limit storage to particular individuals for administrative reasons, financial reasons, or the like. The administrators may also wish to control the rate of growth of data stored in the storage system. In order to limit the amount of storage used by an individual, some file systems have a grant limit (also referred to herein as quota) of storage resources that can be used by a user to limit the storage usage by a user on one or more logical data containers, such as a volume. The grant limit is a limit on the amount of storage resources that can be allocated to the user. There are different types of grant limits, for example, usage quota, block quota, file quota, inode quota, or the like. Usage and block quota limit the amount of disk area that can be used. File and inode quotas limit the number of files and directories that can be created. Specific quotas can be applied to individual users, or alternatively, a default user quota can be established that applies to all users utilizing space within the logical data container. An inode stores basic information about a file, directory, or file system object. Quotas may also be applied to a group of users in a similar manner as with individual users. That is, a system or storage administrator defines a usage or file quota specific to a certain user or group of users. Alternatively, quotas may be implemented for other entities than an individual user or a group of users, such as Human Resources (HR), Engineering, or the like. In addition, administrators typically define a warning level, i.e., a soft quota, at which users are informed that they are nearing their grant limit, which is less than the effective limit, i.e., a hard quota. Also, there may be a grace interval, which allows users to temporarily violate their quotas by certain amounts, if necessary. When an entity meets or exceeds a defined threshold, the storage system detects and/or reports an out-of-space event. An out-of-space event occurs when the entity requests allocation of storage space that would exceed the entities specified grant limit. In defining and implementing grant limits on storage server, an administrator can prevent one user from consuming an entire file system's resources, or create a system of tiered access, in which users can have different levels of restriction. This may be used, for example, to provide different levels of service based upon the needs of individual clients.

Figure 7:
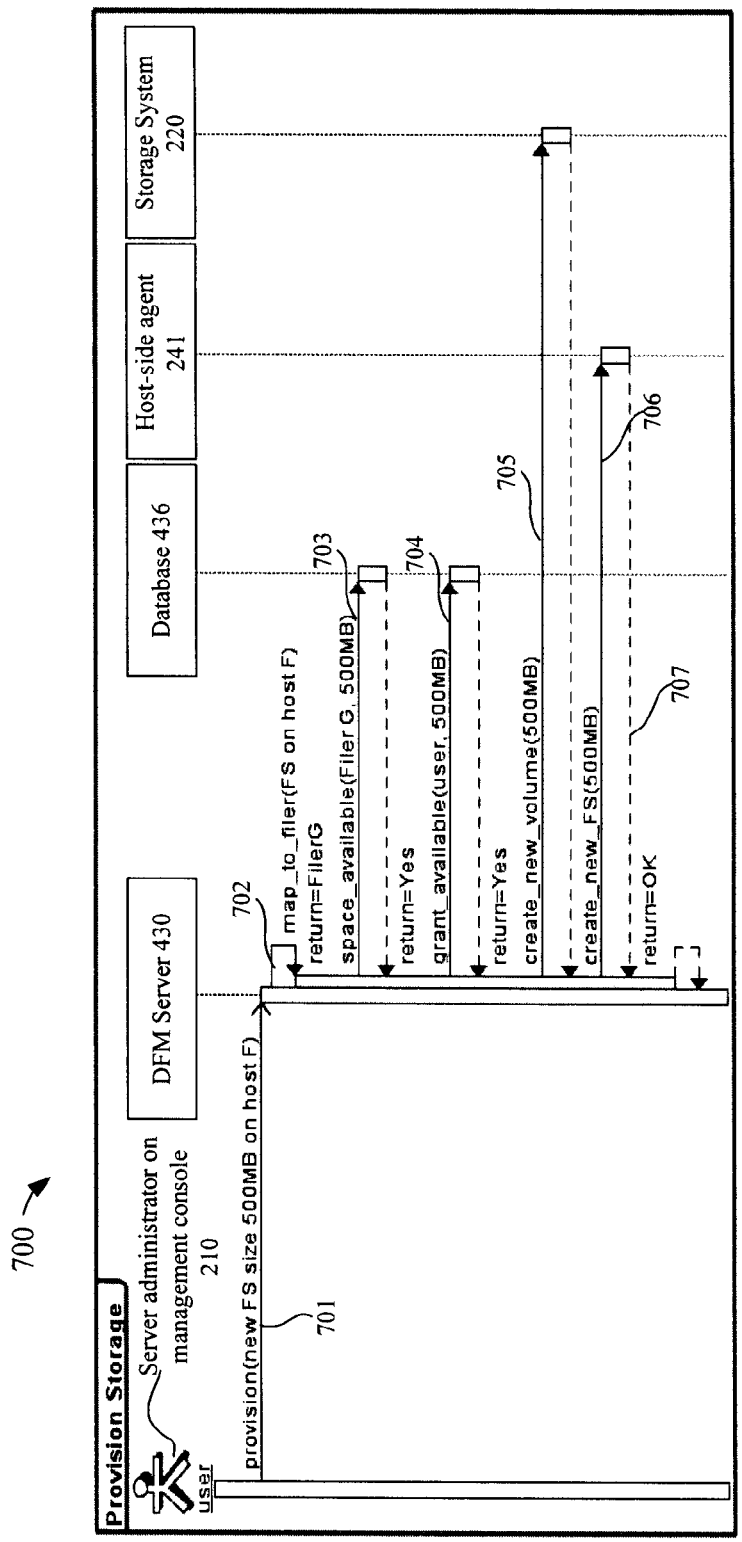
FIG. 7 is a sequence diagram of a method for performing a storage provisioning operation using grant limits according to one embodiment.

FIG. 7 is a sequence diagram of a method 700 for performing a storage provisioning operation using grant limits according to one embodiment. The method 700 may be similar to the method 500, except additional operations may be performed to determine when a storage size of a host-side file system to be created exceeds a grant limit for an entity. When the storage size does not exceed the grant limit, the logical data container having the specified storage size, which corresponds to the host-side file system, may be created. This may be done for example, by performing a lookup operation in a data store to determine when the storage size exceeds the grant limit for the particular entity.

In one embodiment, the grant limits for one or more entities may be stored in the DFM database 436. Alternatively, the grant limits may be stored in other memory locations in the either the management server 230, or the storage system 220. Table 1 illustrates exemplary entries of grant limits for two entities according to one embodiment.

TABLE 1

| Entity | Used Capacity | Total Capacity |
|---|---|---|
| Joe | 500 MB | 1 GB |
| Kostadis | 1 TB | 10 TB |

Each of the entries include the name of the entities (e.g., Joe and Kostadis), a value representative of the used capacity by the entity (e.g., 500 MB and 1 TB), and a grant limit of the total capacity for the entity (e.g., 1 GB and 10 TB). In other embodiments, additional information may be stored in each entry, such as the type of storage resources to be used for the particular entity.

The method 700 starts by the server administrator, through the management console 210, requesting that a new file system be provisioned on the host-side server 240 (e.g., host-side server F), operation 701. The request may include the storage capacity of the file system, such as 500 megabytes (MB). The DFM server 430, upon receiving a request to provision a host-side storage object (e.g., a host-side file system) on the host-side server 240, employing a host-side virtualization strategy, provisions storage on the storage system to correspond to the host-side storage object based on the grant limits. In order to provision a logical data container on the storage system, which employs a storage virtualization strategy, the DFM server 430, maps to a storage server on the storage system (e.g., "Filer G"), operation 702; queries the database 436 to find available space on the designated storage server, operation 703; and queries the database 436 to determine whether the requested storage size, specified in the request, exceeds a grant limit for the requesting entity, operation 704. When the specified storage size does not exceed the grant limit (e.g., "return=Yes"), the DFM server 430 sends a request to the storage system 220 to create a logical data container (e.g., volume 322), having the specified storage size, in the designated storage server, operation 705. However, when the specified storage size exceeds the grant limit, the logical data container is not created (not illustrated, and the DFM server 430 can notify the server administrator through the management console 210. Once the storage system 220 notifies the DFM server 430 that the logical data container is created (e.g., "return=vol 3"), the DFM server 430 can send a request to the host-side agent 241 to provision the file system on the host-side server 240, corresponding to the created logical data container on the storage system 220, operation 706. It should be noted that in this embodiment, only a logical data container is created, and not both a logical data container and a logical data unit. In other embodiments, the host-side agent 241, upon receiving the request in operation 706, may perform the operations described with respect to FIG. 5, including operations 505, 506, and 507. Once the host-side agent 241 has created the host-side file system 342, the host-side agent 241 notifies the DFM server 430 that the base device 341 was created on the host-side server 240, operation 707. The DFM server 430 may update the DFM database 436 to include the newly created storage resources.

Once the host-side agent 241 has notified the DFM server 430 of the base device creation, the DFM server 430 may also notify the server administrator, through the management console, that the host-side file system is created (not illustrated).

It should be noted that the operations 705 and 707 may be performed without administrator interaction at the host-side server 240, and the operation 705 may be performed without administrator interaction at the storage system 220. It should also be noted that although the embodiments of FIGS. 5-7 perform operations with respect to the host-side agent 241 on the host-side server 240, these operations may also be performed to provision storage, take snapshots, or the like, in centrally managing both the host-side storage resources on the multiple heterogeneous host-side servers and the storage resources on the storage system.

In addition to storage provisioning, both host-side file systems and storage systems may use grant limits to detect and/or report out-of-space events. Because the server administrator is centrally managing both the host-side storage objects and the logical data containers on the storage system, the embodiments described herein centrally monitor for out-of-space events in the storage system, and automatically correlate the out-of-space events in the storage system to out-of-space events for the host-side file systems on the host-side servers. This may be done by the management server 230 (e.g., using the DFM server 430). The management server 230 may detect and report the out-of-space events to the respective host-side file system that corresponds to the logical data container in which the event was detected. The centralize management of the out-of-space events may also be monitored using the management console. As described above, from a traditional file system perspective, the storage space is entirely contained within the file system, but when the storage system uses a storage virtualization strategy that uses snapshot operations, thin provisioning, and the like, space outside the host-side file system needs to be monitored (e.g., the underlying storage system) for out-of-space events. For example, multiple host-side file systems may be created, as described herein, and the underlying storage in the storage system, corresponding to the host-side file systems, may be thinly provisioned within one or more logical data container. Although each of the host-side file systems is within the specified grant limits, collectively, the host-side file systems may be exceeding a grant limit on the storage system, creating an out-of-space event. However, the host-side file systems may continue to allocate storage space, since individually, the host-side file system have not exceeded the respective grant limits. The out-of-space event on the storage system, which if not detected and reported to the host-side servers, may lead to data corruption and storage system failure when the host-side file systems collectively exceed the grant limits. The embodiments described below are directed to automatically correlating out-of-space events occurring on the storage system to out-of-space events for the host-side file systems on the host-side servers.

Figure 8:
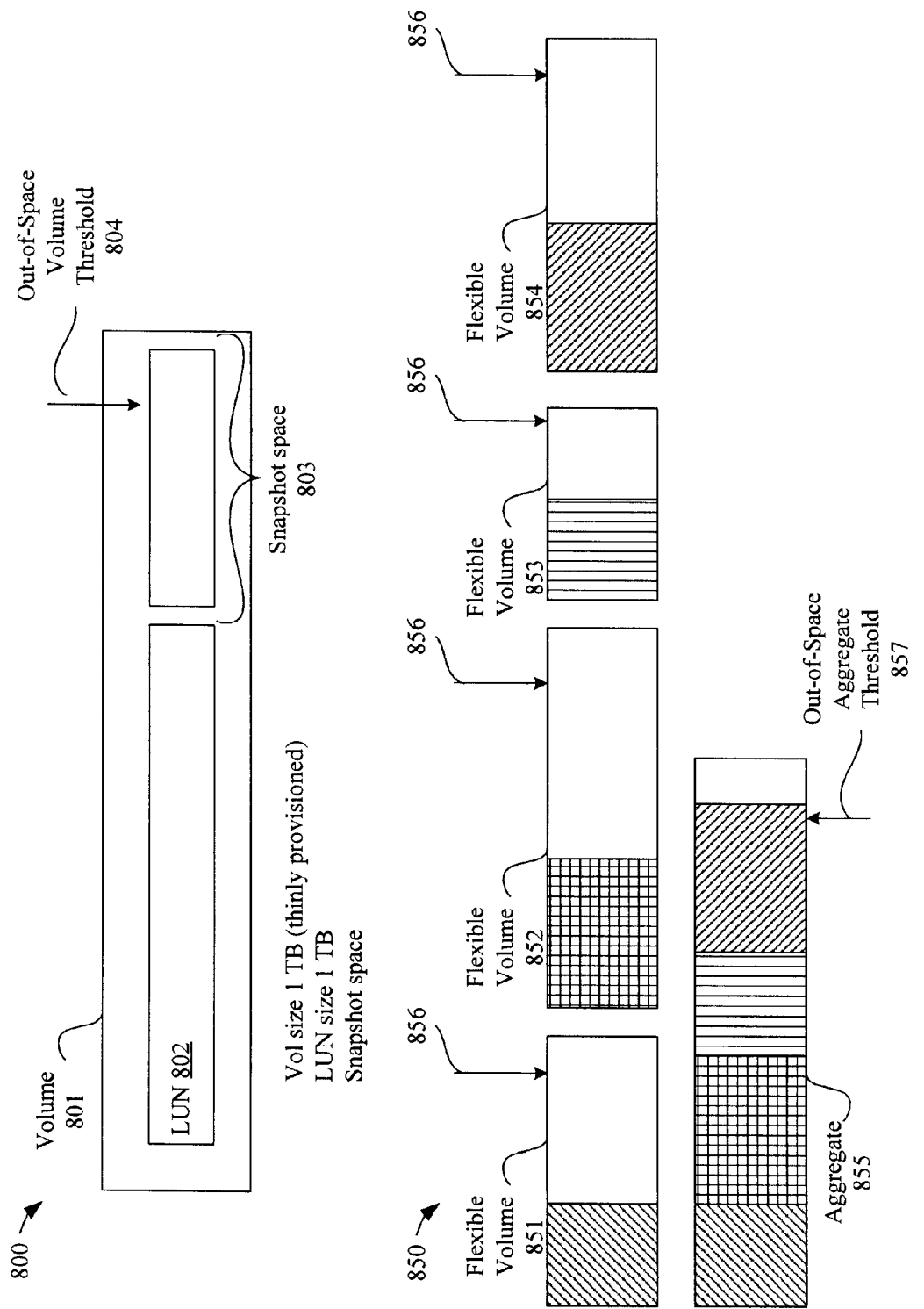
FIG. 8 illustrates graphical representations of two out-of-space storage events according to two embodiments.

FIG. 8 illustrates graphical representations of two out-of-space storage events according to two embodiments. The first graphical representation 800 is of a thinly provisioned volume 801 (e.g., logical data container) having a LUN 802 (e.g., logical unit of data) and snapshot space 803. The snapshot space 803 is used to store data associated with snapshot operations of the volume 801. The more snapshot operations are performed on the volume 801, the snapshot space 803 increases. The volume 801 also has an out-of-space volume threshold 804. When the data in the volume 801 exceeds the out-of-space volume threshold 804, an out-of-space event occurs. For example, the volume 801 is thinly provisioned for 1 terabyte (TB) of data, and the LUN size is also provisioned to be 1TB. When too much data is added to the LUN 802, and snapshot space 803 and exceeds the out-of-space threshold 804, the out-of-space event occurs on the storage system.

The second graphical representation 850 is of multiple host-side file systems, each stored in a flexible volume. In particular, a first file system is stored in a first flexible volume 851, a second file system is stored in a second flexible volume 852, a third file system is stored in a third flexible volume 853, and a fourth file system is stored in a fourth flexible volume 854. Each of the flexible volumes is thinly provisioned logical data containers, which are part of another logical data container, namely aggregate 855, which has an out-of-space aggregate threshold 857. Each of the four flexible volumes 851-854 has an out-of-space volume threshold 856, which may be set at different levels for each of the flexible volumes 851-854. These thresholds 856 of the flexible volumes 851-854 may correspond to host-side file system out-of-space thresholds. In this embodiment, no out-of-space warning is generated at the host-side file, since the file systems have not individually exceeded any of the out-of-space volume thresholds 856. However, collectively, the host-side file systems exceed the out-of-space aggregate threshold 857, creating an out-of-space event on the storage system, while no out-of-space event is detected on each of the host-side servers.

By monitoring the out-of-space events on the storage system, the management server may automatically correlate the detected out-of-space events to out-of-space events for the corresponding affected host-side file system. For example, this may happen when either data in one of the flexible volumes 851-854 exceeds the out-of-space volume threshold 856, or the data in the aggregate 855 exceeds an out-of-space aggregate threshold 857. The management server may report the out-of-space events to the respective host-side servers. In one embodiment, the monitoring may be performed by the monitoring manager 435 of the DFM server 430, as described with respect to FIG. 4 above. The monitoring manager 435 monitors various thresholds on both the host-side servers 440 and the storage systems 420, such as the volume space reservation threshold, the volume out-of-space threshold, the volume nearly-full threshold, the host-side file system out-of-space threshold, the host-side file system nearly-full threshold, or the like. It should be noted that each of the host-side agents 441 and 442 may generate events about the status of the host-side storage objects and report them to the monitoring manager 435 when detected or upon request from the monitoring manager 435. When out-of-space events are detected by the monitoring manager 435, the event manager 437 may store the event in the DFM database 436 and/or perform some action, such as notifying the host-side servers, the management console 210, or a third-party management console of the detected event. For example, the event manager 437 may generate an email when an out-of-space event occurs on the storage system 220.

Figure 9:
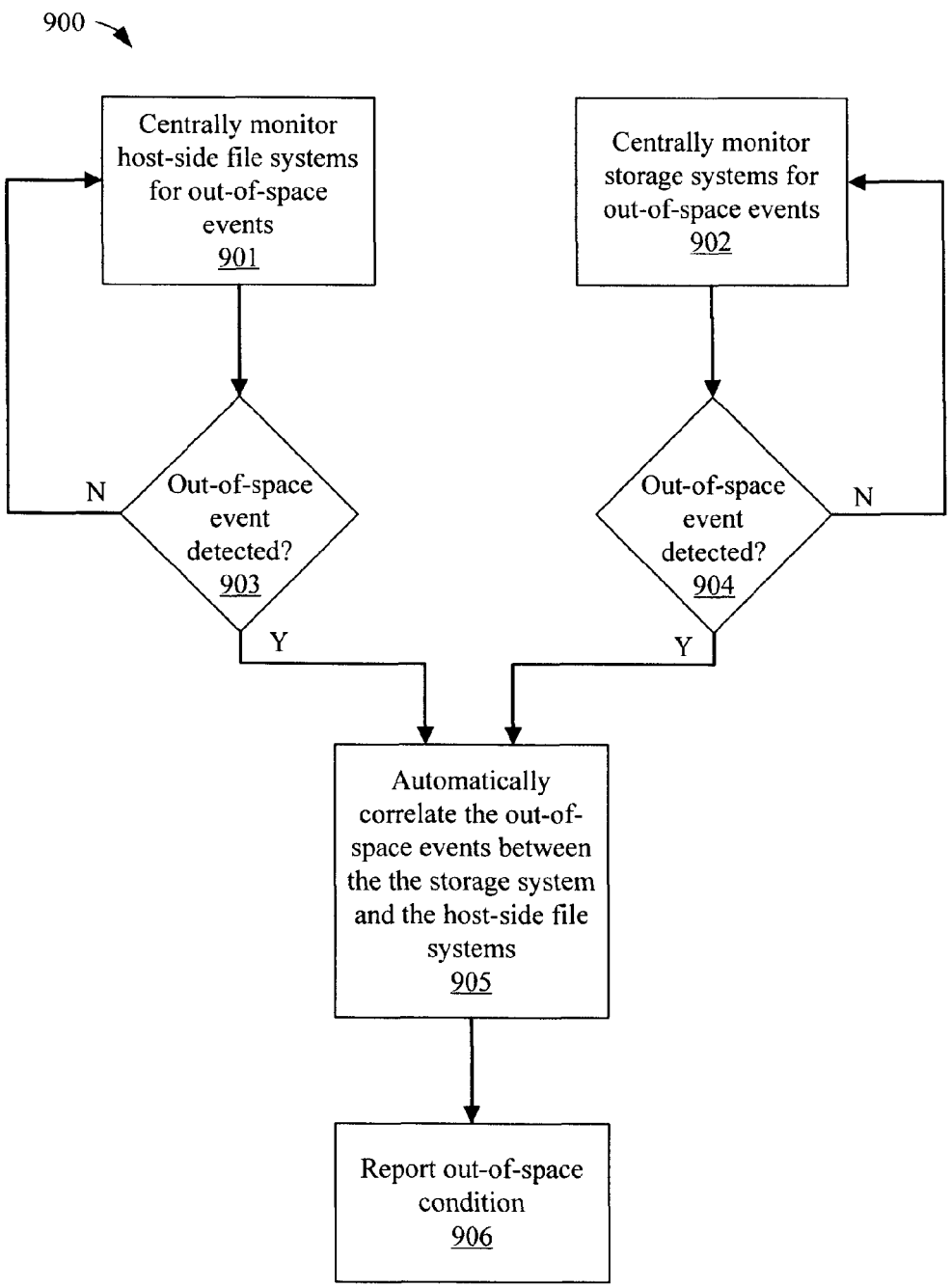
FIG. 9 is a flow chart of a method for correlating storage events to host-side storage objects according to one embodiment.

FIG. 9 is a flow chart of a method 900 for correlating storage events to host-side storage objects according to one embodiment. The method 900 starts by centrally monitoring host-side file systems for out-of space events, operation 901, and centrally monitoring the storage system for out-of-space events, operation 902. The method determines whether an out-of-space event has been detected in one of the host-side file systems, operation 903, and whether an out-of-space event has been detected in the storage system, operation 904. When no out-of-space event is detected in the host-side file systems, the method returns to operation 901, and when no out-of-space event is detected in the storage system, the method returns to operation 903. However, when an out-of-space event is detected in either one of the host-side file systems or the storage system, the method 900 automatically correlates the out-of-space events between the storage system and the host-side file systems, operation 905. In one embodiment, an out-of-space event is detected in the storage system, as described above with respect to FIG. 8, and the method 900 automatically correlates the out-of-space event with the host-side file systems affected by the out-of-space condition. For example, the four file systems that exceed the out-of-space aggregate threshold 857 in the aggregate 855. Once the method 900 has automatically correlated the out-of-space events, the method 900 reports the out-of-space event, operation 906. In one embodiment, the method 900 reports the out-of-space event to the respective host-side server where the affected host-side file system resides, for example, to prevent the user request from allocating additional space in the host-side file system. In another embodiment, the method 900 reports the out-of-space event to the server administer through the management console 210. Alternatively, the method may generate other types of warnings, such as emails or log files, to report the out-of-space condition.

Figure 10:
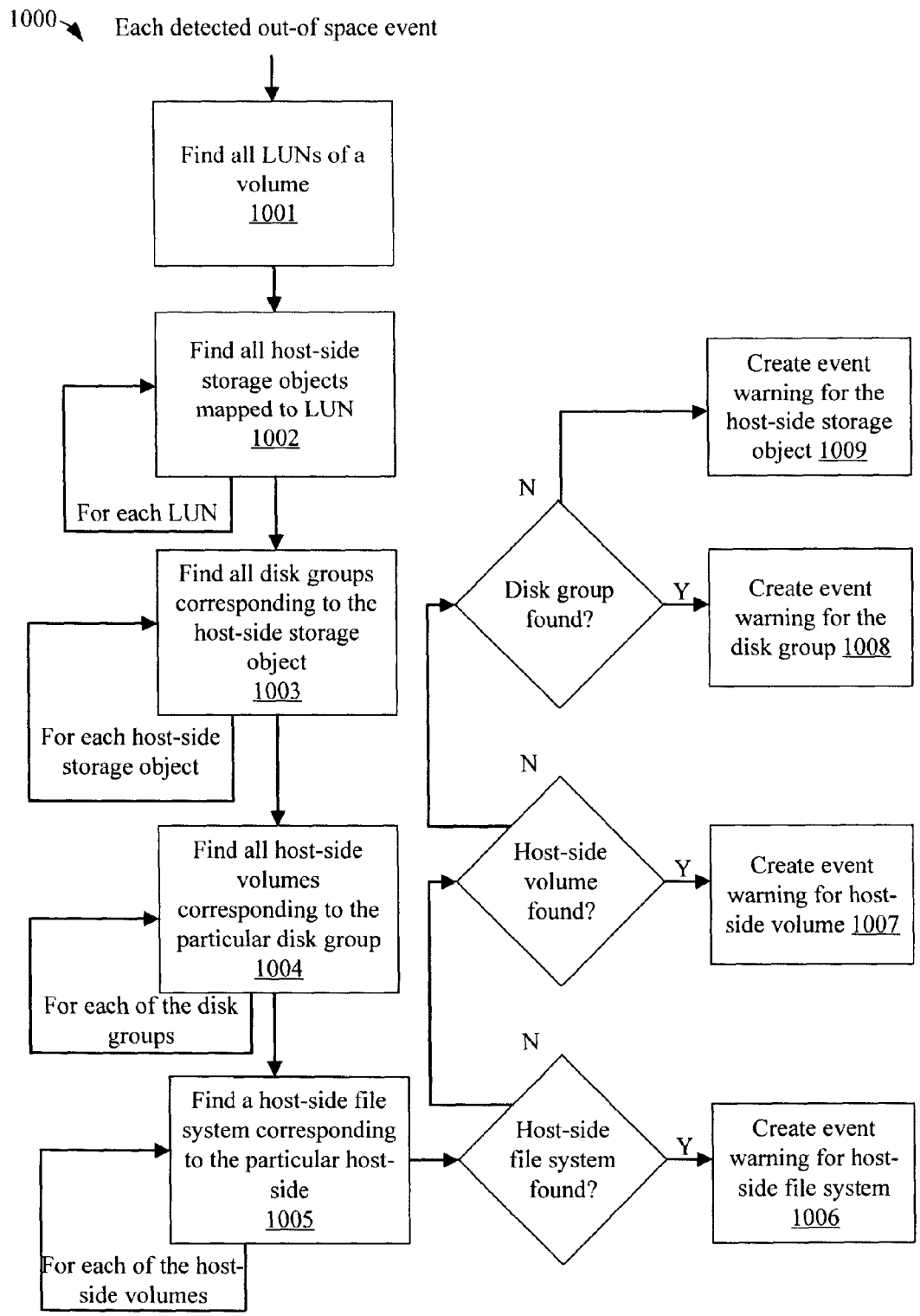
FIG. 10 is a flow chart of a method for automatically correlating out-of-space events according to one embodiment.

FIG. 10 is a flow chart of a method 1000 for automatically correlating out-of-space events according to one embodiment. The method 1000 starts by finding all logical units of data (e.g., LUNs) of a logical data container (e.g., volume) stored in the storage system, for each of the detected out-of-space events, operation 1001. The method 1000 finds all host-side storage objects that are mapped to the particular logical unit of data, for each of the logical units of data, operation 1002. The method 1000 finds all disk groups that correspond to the particular host-side storage object, for each of the host-side storage objects, operation 1003. For each of the disk groups, the method 1000 finds all host-side volumes that correspond to the particular disk group, operation 1004. For each of the found host-side volumes, the method finds a host-side file system that corresponds to the particular host-side volume, operation 1005. When the host-side file system is found, the method 1000 creates an event warning of the out-of-space event for the found host-side file system, operation 1006. When the host-side file system is not found and the host-side volume is found, the method 1000 creates an event warning of the out-of-space event for the found host-side volume, operation 1007. When the host-side volume is not found and the disk group is found, the method 1000 creates an event warning of the out-of-space event for the found disk group, operation 1008. When no disk group is found, the method 1000 creates an event warning of the out-of-space event for the host-side storage object, operation 1009.

It should be noted that some of the operations of the method 1000 may not be performed for some types of host-side file systems, for example, for host-side servers that employs host-side virtualization strategies that do not use disk groups, host-side volumes, etc. In another embodiment, the method finds all file systems (e.g., NFS file systems) that are mounted over a logical data container stored in the storage system, for each of the out-of-space events, and creates an event warning of the out-of-space event for each of the file systems. In another embodiment, the method finds all logical units of data of a logical data container for each of the out-of-space events. For each of the logical units of data, the method finds all host-side storage objects that are mapped to the particular logical unit of data. For each of the host-side storage objects, the method finds a file system that corresponds to the particular host-side storage object. The method determines when the host-side file system is found and consequently creates an event warning of the out-of-space event for the found host-side file system. When the host-side file system is not found, the method creates an event warning of the out-of-space event for the found host-side storage object.

In one embodiment, the automatic correlation of the host-side storage objects and the logical data containers is performed using the following algorithm. It should be noted that in other embodiments, other algorithms may be used, based on the type of host-side virtualization strategy being employed on the particular host-side servers.

```
Find all events for storage system Volume
SELECT * FROM events WHERE
    eventType='df.kbytes' AND
    (eventStatus='full' OR eventStatus='almostFull');
FOR EACH Event
BEGIN
Find all luns that are part of this storage system volume
    SELECT * FROM lunPath WHERE
    lunVolumeId=events.eventSourceId;
FOR EACH Luns
BEGIN
    Find all host side device that is mapped to this LUN
    SELECT * FROM mpDeviceInfo WHERE
        lunPathId=lunPaths.lunPathId;
    FOR EACH mpDevice
    BEGIN
    Find all disk group or file system that is sitting over this mp
        device
    SELECT * FROM objects WHERE
        objId=mpDeviceInfo.resourceId;
    IF objects.objType='Disk Group'
    THEN
        Find all host volumes sitting over this disk group
        SELECT * FROM hostVolume WHERE
            dgId=objects.objId;
        IF hostVolume FOUND
        THEN
           Find file system sitting over this host volume
           SELECT * FROM fileSystem WHERE
               parentDeviceId=hostVolume.hvId;
           IF fileSystem FOUND
           THEN
              Create a new event "file system writes in danger"
                  for this File System
           ELSE
              Create a new event "host volume writes in danger" for this Host Volume
           ENDIF
        ELSE
           Create a new event "disk group writes in danger"
               for this Disk Group
        ENDIF
    ELSE
        IF objects.objType='File System'
        THEN
           Create a new event "file system writes in danger"
               for this File System
        ELSE
           Create a new event "writes to this device are in
               danger" for this device
        ENDIF
    ENDIF
END//END FOR EACH mpDevice
END//END FOR EACH Luns
Find all nfs file systems that are mounted over this storage
system volume
    SELECT * FROM fileSystem WHERE
    parentDeviceId=events.eventSourceId;
    FOR EACH fileSystem
    BEGIN
        Create a new event "file system writes in danger" for this
            File System
    END
END//END FOR EACH Event
```

It should be noted that the methods described here may be performed by processing logic that may comprise hardware (circuitry, dedicated logic, or the like), software (such as is run on a general purpose computer system or a dedicated machine), or a combination of both. In another embodiment, the methods described herein may be performed by processing logic of the management server 230 of FIG. 2. In another embodiment, the methods described herein may be performed as part of the SRM tool of FIG. 4.

Figure 11:
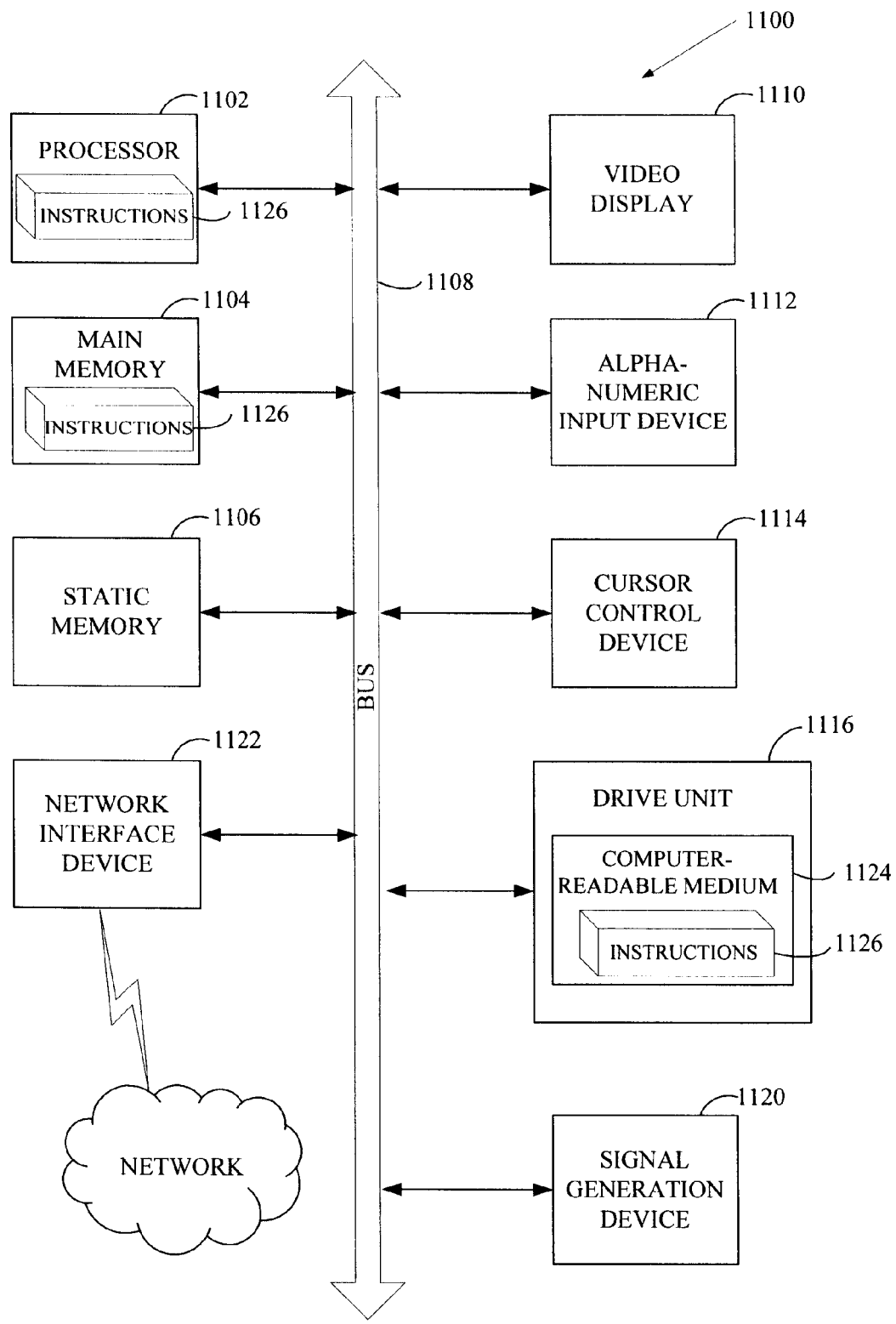
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1118 (e.g., a data storage device), which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The secondary memory 1118 may include a machine-readable storage medium (or more specifically a computer-readable storage medium) 1131 on which is stored one or more sets of instructions (e.g., software 1122) embodying any one or more of the methodologies or functions described herein. The software 1122 may also reside, completely or at least partially, within the main memory 1104 and/or within the processing device 1102 during execution thereof by the computer system 1100, the main memory 1104 and the processing device 1102 also constituting machine-readable storage media. The software 1122 may further be transmitted or received over a network 1120 via the network interface device 1108.

While the machine-readable storage medium 1131 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The embodiments described herein are directed to a centralized monitoring tool that inspects both storage objects on a storage system and host-side storage objects on multiple heterogeneous host-side servers. As contrasted with conventional systems which typically only provide visibility into the virtualization on the host-side server and requires communication with the storage administrator for visibility into the virtualization on the storage system, the embodiments described herein may provide complete visibility into both the virtualization on the host-side servers, as well as the virtualization on the storage system, such as to determine why the storage is or is not performing without requiring communication to the storage administrator and/or administrator interaction at the storage server. Using this increase in visibility, the server administrator may take corrective action without coordination with the server administrator. The complete visibility may also help the server administrator understand the storage resources are being used from top to bottom in abstraction.

The embodiments described herein may present the workflow of operations (e.g., provisioning and snapshot operations) and resulting information in a way that is understandable to the server administrator (e.g., host-side storage objects (base device), host-side file systems, volume groups, host volumes, etc), as opposed to being understandable to the storage administrator (e.g., LUN, volumes, aggregates, etc). The embodiments described herein are able to understand the underlying storage infrastructure in order to take advantage of the storage virtualization strategy employed by the storage system. In particular, the management server understands the storage virtualization strategy of the storage system, and the host-side agent understands the particular host-side virtualization strategy (e.g., understands the host-side file system). The embodiments described herein coordinate interaction between the logical data containers on the storage server and the host-side agents of multiple heterogeneous host-side servers.

It should be noted that the storage system described herein may be one of the storage systems, available from NetApp, Inc. of Sunnyvale, Calif. Also, as described herein, the capability to centrally manage the server 10 stack and use storage virtualization may be provided through a host-side agent. In one embodiment, the host-side agent is the SNAPDRIVE® server, available from NetApp, Inc. of Sunnyvale, Calif., which has the ability to monitor and manage the host-side storage objects. The SNAPDRIVE® server may be used to provision logical data containers on the respective host-side server, allowing the management server to centrally provision logical data containers and logical units of data for host-side objects residing on multiple heterogeneous host-side servers. The SNAPDRIVE® server may also be used to allow policy-based provisioning, acting as a provisioning manager. The host-side agents may be, for example, the SNAPDRIVE® server (referred to herein as SDW server) for a host running the Windows operating system, the SNAPDRIVE® server for a Unix-based host running a Unix-based operating system (referred to herein as SDW server), or similar agents on hosts running other types of operating systems, such as the Linux operating system, or the like.

Using the embodiments described herein, one possible advantage may be that a server administrator may quickly perform end-to-end storage provisioning that includes both the host-side file system and the underlying storage array without involving the storage administrator. The end-to-end provisioning may take into account both the storage objects and the host-side storage objects to present a global view of the storage infrastructure. Since the end-to-end storage provisioning is performed independent of the type of file system that is being provisioned, the amount of understanding of each type of heterogeneous file system by the server administrator decreases, such as the host-side virtualization (e.g., how each of the file systems, volume managers, disk managers operate).

Also, as described above, one of the basic challenges when a host file system is stored in a storage system that implements storage-based snapshots and thin provisioning is how to report out-of-space conditions. Since the storage space for the host-side file system may be thinly provisioned or include snapshot data, the out-of-space conditions on the storage system need to be correlated and reported to the server administrator as out-of-space conditions for the host-side file systems on the host-servers. From a traditional file system perspective, the storage space is entirely contained within the file system, however, when using an underlying storage system, there is storage space that exists outside of the host-file system. For example, when a storage virtualization strategy employs multiple flexible volumes in an aggregate, each of the flexible volumes may not individually be out of space, but the collective space of the aggregate may exceed an out-of-space threshold. This out-of-space event occurs on the storage systems. The embodiments described herein are able to coordinate out-of-space events detected on the storage server to out-of-space events to the respective host-side file systems that are affected by the out-of-space events on the storage system. Without coordination of the out-of-space events between the storage system and the host-side servers, events in the storage layer may be invisible at the host layer. Using these embodiments, the server administrator is able to know when the storage resource is running out of space and/or that the server administrator is running out of snapshots.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram formats in order to avoid unnecessarily obscuring the present invention. Thus, the specific details set forth are merely exemplary. Particular implementations may vary from these exemplary details and still be contemplated to be within the spirit and scope of the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Although the operations of the method(s) herein are shown and described in a particular order, the order of the operations of each method may be altered so that certain operations may be performed in alternative orders or so that certain operation may be performed, at least in part, concurrently with other operations. In another embodiment, instructions or sub-operations of distinct operations may be in an intermittent and/or alternating manner.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The operations may be performed sequentially, or alternatively, in parallel. The various operations may also be implemented in, for example, special purpose logic circuitry, e.g., a field programmable gate array (FPGA), digital signal processor (DSP), Application-specific integrated circuit (ASIC), programmable logic device (PLD), or the like).

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory, or another type of medium suitable for storing electronic instructions. The machine-readable transmission medium may include, but is not limited to, electrical, optical, acoustical, or other form of propagated signal (e.g., carrier waves, infrared signals, digital signals, etc.).

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computerized system, comprising:
a plurality of heterogeneous host-side servers, wherein each of the plurality of heterogeneous host-side servers employs one of a plurality of different host-side virtualization strategies, wherein each host-side virtualization strategy defines a plurality of host-side storage objects;
a storage system, including a storage server, coupled to the plurality of host-side servers, wherein the storage system employs a storage virtualization strategy and has a plurality of logical data containers to store data associated with the plurality of host-side storage objects defined by the storage virtualization strategy; and
a management server coupled to the storage system and the plurality of heterogeneous host-side servers, wherein the management server is to centrally manage the plurality of host-side storage objects, according to the plurality of different host-side virtualization strategies, and to centrally manage the plurality of logical data containers that correspond to the plurality of host-side storage objects, according to the storage virtualization strategy, and without administrator interaction at the storage system, wherein the management server comprises a storage resource management tool to coordinate end-to-end storage provisioning of host-side storage objects of the plurality of heterogeneous host-side servers homogeneously in storage arrays of the storage system, wherein the storage resource management tool comprises:
- a data fabric manager (DFM) server;
- a host-side client interface communicatively coupled to host-side agents residing on the plurality of heterogeneous host-side servers, wherein the DFM server is configured to manipulate the plurality of host-side storage objects using the host-side agents via the host-side client interface;
- a storage system client interface communicatively coupled to storage system, wherein the DFM server is configured to manipulate the plurality of logical data containers via the storage system client interface; and
- a data store communicatively coupled to the DFM server to store information regarding a storage resource model which represents how the plurality of host-side storage objects are associated with the plurality of logical data containers.

2. The system of claim 1, wherein the management server is to automatically provision one of the plurality of logical data containers of the storage system according to the storage virtualization strategy without administrator interaction at the storage system.

3. The system of claim 2, wherein the management server is to automatically provision one of the plurality of host-side storage objects on one of the plurality of host-side servers, wherein the one logical data container corresponds to the one host-side storage object.

4. The system of claim 2, wherein the management server is to automatically provision the one logical data container by thin provisioning the one logical data container on the storage system.

5. The system of claim 2, wherein the management server is to automatically provision the one logical data container by sending a request to the storage system to automatically allocate the one logical data container on the storage system which corresponds to the respective one of the plurality of host-side storage objects according to the storage virtualization strategy without administrator interaction at the storage system.

6. The system of claim 1, wherein each of the plurality of host-side storage objects comprises a base device that is representative of one of the plurality of logical data containers.

7. The system of claim 1, wherein the management server is to manage a server stack across the plurality of heterogeneous host-side servers and to utilize the storage virtualization strategy to provision one of the plurality of logical data containers in the storage system for each of a plurality of file systems of the plurality of heterogeneous host-side servers.

8. The system of claim 1, further comprising a management console generated by the management server, wherein an administrator on the management console manages the plurality of host-side virtualization strategies on the plurality of host-side servers and storage virtualization on the storage system.

9. The system of claim 8, wherein the administrator, by way of the management console, manages the storage virtualization of the storage system automatically without administrator interaction at the storage system.

10. The system of claim 1, wherein a first host-side server of the plurality of host-side servers operates a first operating system having a first host-side virtualization type, and a second host-side server of the plurality of host-side servers operates a second operating system having a second host-side virtualization type.

11. The system of claim 1, wherein the management server is to automatically perform a snapshot operation on logical data containers on the storage system according to the storage virtualization strategy without administrator interaction at the storage system.

12. The system of claim 1, wherein the storage virtualization strategy is storage device-based virtualization.

13. The system of claim 1, wherein the storage virtualization strategy is network-based virtualization.

14. The system of claim 1, wherein the storage resource management tool is to allow an administrator from a management console to manage virtualization of a plurality of host-side file systems on the plurality of host-side servers according to the plurality of different host-side virtualization strategies and to manage storage virtualization of the storage system according to the storage virtualization strategy without administrator interaction at the storage system.

15. The system of claim 14, wherein the storage resource management tool is to communicate with a host-side agent that is to manipulate host-side storage objects on the host-side file system as part of coordinating the end-to-end storage provisioning of host-side storage objects.

16. The system of claim 1, wherein the storage resource management tool is to centrally manage logical data containers in the storage system storing the data corresponding to the host-side storage objects.

17. A method, comprising:
coordinating, using a storage resource management tool of the management server, end-to-end storage provisioning of a plurality of host-side storage objects of a plurality of host-side servers homogeneously in to storage arrays of a storage system, including a storage server, wherein each of the plurality of host-side servers employs one of a plurality of different host-side virtualization strategies, wherein the storage system employs a storage virtualization strategy that is different than the plurality of different host-side virtualization strategies and has a plurality of logical data containers to store data associated with the plurality of host-side storage objects defined by the storage virtualization strategy, wherein said coordinating comprises:
- manipulating, by a data fabric manager (DFM) server of the storage resource management tool, the plurality of host-side storage objects using host-side agents residing on the plurality of host-side servers via a host-side client interface and without administrator interaction at the plurality of host-side servers;
- manipulating, by the DFM server, the plurality of logical data containers via a storage system client interface and without administrator interaction at the storage system; and
- storing, by the DFM server, information at a data store of the management server regarding a storage resource model which represents how the plurality of host-side storage objects are associated with the plurality of logical data containers.

18. The method of claim 17, wherein the host-side storage object is a host-side file system.

19. The method of claim 17, wherein said manipulating the plurality of logical data containers comprises provisioning one of the plurality of logical data containers, and wherein said provisioning the logical data container comprises thin provisioning the one logical data container on the storage system.

20. The method of claim 17, further comprising:
receiving a request at the management server to provision a host-side file system on a first host-side server of the plurality of host-side servers;
provisioning a logical unit of data in one of the plurality of logical data container without administrator interaction at the storage system; and
provisioning the host-side file system, which correspond to the logical unit of data, on the first host-side server without administrator interaction at the first host-side server.

21. The method of claim 20, further comprising:
determining when a storage size of the host-side file system, specified in the request, exceeds a grant limit for an entity; and
creating one of the plurality of logical data containers having the specified storage size when the storage size does not exceed the grant limit.

22. The method of claim 21, wherein determining when the storage size exceeds the grant limit comprises performing a lookup operation in a data store to determine when the storage size exceeds the grant limit for the entity.

23. The method of claim 20, wherein creating the one logical data container comprises:
sending a request to the storage system to create the one logical data container; and
receiving from the storage system information regarding the created logical data container, and wherein provisioning the logical unit of data comprises:
sending another request to the storage system to provision the logical unit of data in the one logical data container; and
receiving from the storage system information regarding the provisioned logical data container.

24. The method of claim 23, wherein provisioning the host-side file system comprises:
sending a request to the first host-side server to mount the logical unit of data on the first host-side server; and
sending a request to the first host-side server to create the host-side file system, which corresponds to the logical unit of data, on the first host-side server.

25. The method of claim 20, further comprising determining when there are sufficient storage resources to provision the one logical data container, wherein the one logical data container is provisioned when there is sufficient storage resources.

26. The method of claim 20, wherein provisioning the host-side file system comprises receiving at the first host-side server provisioning information from the management server concerning the provisioned logical unit of data, and wherein provisioning the host-side file system comprises provisioning the host-side file system based on the provisioning information.

27. A management server, comprising:
a processor;
a first communication interface through which to communicate with host-side agents residing on a plurality of heterogeneous host-side servers, wherein each of the plurality of host-side servers employs one of a plurality of different host-side virtualization strategies, wherein each host-side virtualization strategy defines a plurality of host-side storage objects;
a second communication interface through which to communicate with a storage system, including a storage server, wherein the storage system employs a storage virtualization strategy and has a plurality of logical data containers to store data associated with the plurality of host-side storage objects defined by the storage virtualization strategy, and wherein the storage virtualization strategy is different from the host-side virtualization strategies; and
a memory storing executable instructions that configure the processor to execute a storage resource management tool to coordinate end-to-end storage provisioning of host-side storage objects of the plurality of heterogeneous host-side servers homogeneously in storage arrays of the storage system, wherein the storage resource management tool comprises:
a data fabric manager (DFM) server;
a host-side client interface communicatively coupled to host-side agents residing on the plurality of heterogeneous host-side servers, wherein the DFM server is configured to manipulate the plurality of host-side storage objects using the host-side agents via the host-side client interface;
a storage system client interface communicatively coupled to storage system, wherein the DFM server is configured to manipulate the plurality of logical data containers via the storage system client interface; and
a data store communicatively coupled to the DFM server to store information regarding a storage resource model which represents how the plurality of host-side storage objects are associated with the plurality of logical data containers.

28. The management server of claim 27, wherein the processor is to centrally provision one of the plurality of logical data containers by:
receiving a request to provision the one logical data container for the host-side storage object of the host-side file system;
sending the request to the storage system through the second interface;
receiving provisioning information regarding the one logical data container from the storage system through the second interface; and
provisioning the host-side file system on the first host-side server through the first interface based on the provisioning information.

* * * * *